US012593080B2

(12) United States Patent
Chandrasekhar et al.

(10) Patent No.: US 12,593,080 B2
(45) Date of Patent: ***Mar. 31, 2026

(54) SYSTEM AND METHOD FOR ANALYZING VIDEOS IN REAL-TIME

(71) Applicant: EDISN INC., Wilmington, DE (US)

(72) Inventors: Akshay Chandrasekhar, Bangalore (IN); Shivank Gupta, Bangalore (IN); Monish Kumar Keswani, Kalyan (IN); Arjun Kashyap, Mysuru (IN)

(73) Assignee: Edisn Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,687

(22) Filed: Jun. 4, 2024

(65) Prior Publication Data

US 2024/0323457 A1 Sep. 26, 2024

Related U.S. Application Data

(63) Continuation of application No. 17/904,222, filed as application No. PCT/IB2021/050824 on Feb. 2, 2021, now Pat. No. 12,034,981.

(30) Foreign Application Priority Data

Feb. 13, 2020 (IN) .............................. 202041006309

(51) Int. Cl.
*H04N 21/2187* (2011.01)
*G06V 20/40* (2022.01)
(Continued)

(52) U.S. Cl.
CPC ......... *H04N 21/2187* (2013.01); *G06V 20/42* (2022.01); *G06V 20/46* (2022.01);
(Continued)

(58) Field of Classification Search
CPC ......... H04N 21/2187; H04N 21/23418; H04N 21/84; G06V 20/46; G06V 40/172; G06V 20/42; G06V 30/147; G06V 30/10
(Continued)

(56) References Cited

U.S. PATENT DOCUMENTS

2008/0134260 A1    6/2008   Glassman et al.
2015/0208138 A1 *  7/2015   Oguchi ............ H04N 21/47202
                                                    382/103
2016/0371534 A1    12/2016  Koul et al.

FOREIGN PATENT DOCUMENTS

GB          2575843  A  *  1/2020  ........... A63F 13/497
WO      WO-2014142758  A1 *  9/2014  ......... G06Q 30/0241

OTHER PUBLICATIONS

Chris Black, RTMP vs HLS: A Comprehensive Guide (Year: May 25, 2019 ).*

* cited by examiner

*Primary Examiner* — Nnenna N Ekpo
(74) *Attorney, Agent, or Firm* — Kasha Law LLC; John R. Kasha; Kelly L. Kasha

(57) ABSTRACT

A method and a sports analytics system (SAS) for analyzing a live video broadcast stream (LVBS) of a sporting event are provided. The SAS splits the LVBS into a real time messaging protocol (RTMP) stream and a hypertext transfer protocol live stream (HLS) and analyses the RTMP stream using a phase difference between the RTMP stream and the HLS. The SAS detects persons present in a frame of the RTMP stream using a first set of cues and tracks the detected persons by analyzing preceding frames. The SAS recognizes the tracked persons using a second set of cues, assigns individual weights to each of the second set of cues, and compares the assigned weights of each of the recognized persons with pre-existing data of all players to identify the (Continued)

players in the frame. The SAS transmits the HLS and contextual interactive content of the identified players to a user device.

26 Claims, 24 Drawing Sheets

(51) Int. Cl.
| | |
|---|---|
| *G06V 30/10* | (2022.01) |
| *G06V 30/146* | (2022.01) |
| *G06V 40/16* | (2022.01) |
| *H04N 21/234* | (2011.01) |
| *H04N 21/84* | (2011.01) |

(52) U.S. Cl.
CPC .......... *G06V 30/147* (2022.01); *G06V 40/172* (2022.01); *H04N 21/23418* (2013.01); *H04N 21/84* (2013.01); *G06V 30/10* (2022.01)

(58) Field of Classification Search
USPC .......................................................... 725/40
See application file for complete search history.

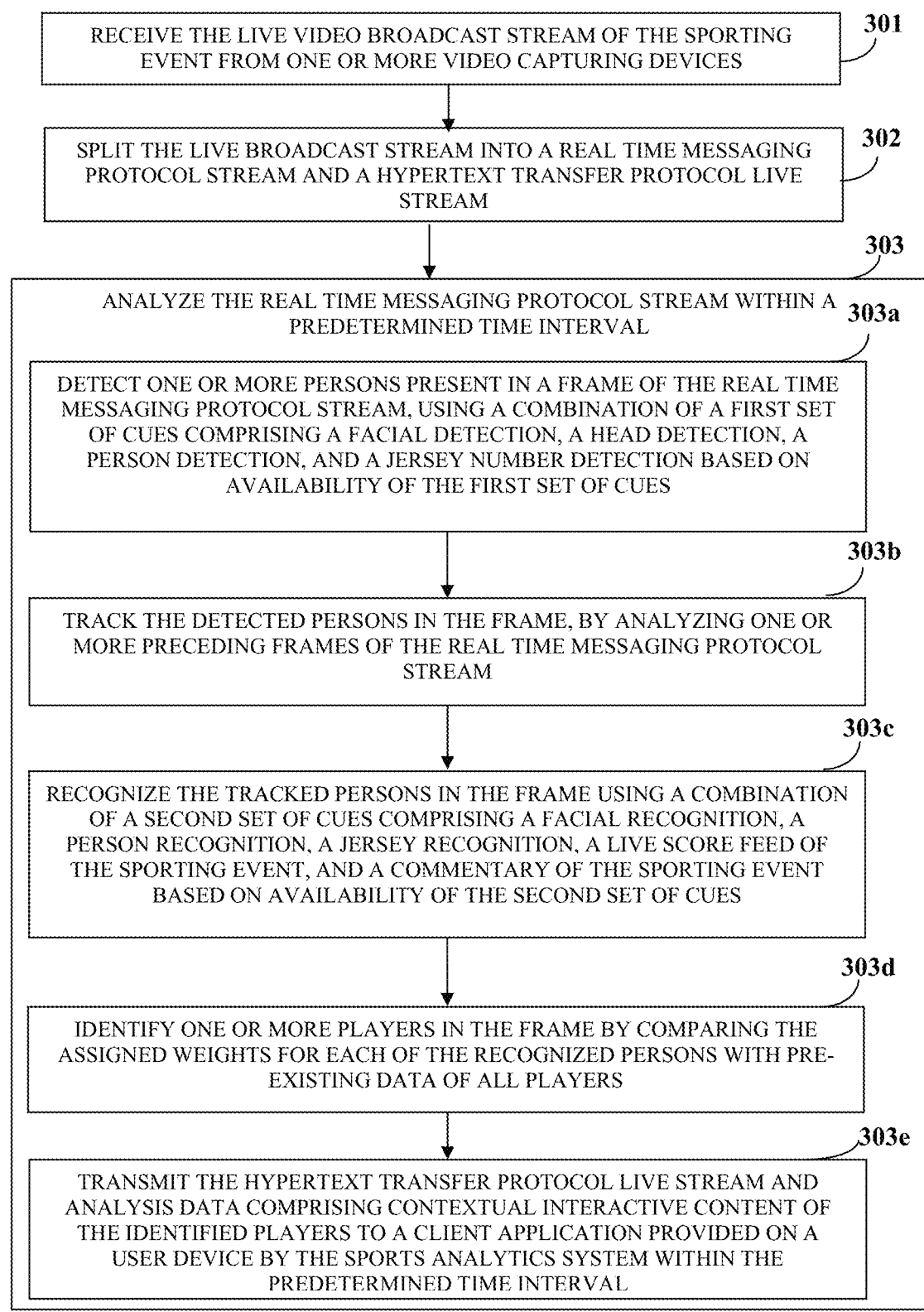

RECEIVE THE LIVE VIDEO BROADCAST STREAM OF THE SPORTING EVENT FROM ONE OR MORE VIDEO CAPTURING DEVICES — 301

SPLIT THE LIVE BROADCAST STREAM INTO A REAL TIME MESSAGING PROTOCOL STREAM AND A HYPERTEXT TRANSFER PROTOCOL LIVE STREAM — 302

303

ANALYZE THE REAL TIME MESSAGING PROTOCOL STREAM WITHIN A PREDETERMINED TIME INTERVAL — 303a

DETECT ONE OR MORE PERSONS PRESENT IN A FRAME OF THE REAL TIME MESSAGING PROTOCOL STREAM, USING A COMBINATION OF A FIRST SET OF CUES COMPRISING A FACIAL DETECTION, A HEAD DETECTION, A PERSON DETECTION, AND A JERSEY NUMBER DETECTION BASED ON AVAILABILITY OF THE FIRST SET OF CUES

303b

TRACK THE DETECTED PERSONS IN THE FRAME, BY ANALYZING ONE OR MORE PRECEDING FRAMES OF THE REAL TIME MESSAGING PROTOCOL STREAM

303c

RECOGNIZE THE TRACKED PERSONS IN THE FRAME USING A COMBINATION OF A SECOND SET OF CUES COMPRISING A FACIAL RECOGNITION, A PERSON RECOGNITION, A JERSEY RECOGNITION, A LIVE SCORE FEED OF THE SPORTING EVENT, AND A COMMENTARY OF THE SPORTING EVENT BASED ON AVAILABILITY OF THE SECOND SET OF CUES

303d

IDENTIFY ONE OR MORE PLAYERS IN THE FRAME BY COMPARING THE ASSIGNED WEIGHTS FOR EACH OF THE RECOGNIZED PERSONS WITH PRE-EXISTING DATA OF ALL PLAYERS

303e

TRANSMIT THE HYPERTEXT TRANSFER PROTOCOL LIVE STREAM AND ANALYSIS DATA COMPRISING CONTEXTUAL INTERACTIVE CONTENT OF THE IDENTIFIED PLAYERS TO A CLIENT APPLICATION PROVIDED ON A USER DEVICE BY THE SPORTS ANALYTICS SYSTEM WITHIN THE PREDETERMINED TIME INTERVAL

FIG. 3

$(x_{min}, y_{min})$ $(x_{max}, y_{max})$ (x_min, y_min)

(x_max, y_max)

(x_min, y_min)

(x_max, y_max)

Incoming face
embeddings

Pre-computed
embeddings

SYSTEM AND METHOD FOR ANALYZING VIDEOS IN REAL-TIME

RELATED APPLICATIONS

This application is a continuation of U.S. patent application Ser. No. 17/904,222, filed Aug. 13, 2022, which claims the benefit of Indian Patent Application No. 202041006309, filed on Feb. 14, 2020, the content of all of which is incorporated by reference herein in their entireties.

BACKGROUND

The present invention relates to a system and a method for analysing a video stream. More particularly, the present invention relates to a sports analytics system and a method for analyzing a live video broadcast stream of a sporting event.

Broadcasting sporting events is a very common practice where spectators are able to experience the events which they missed to attend in person. This also enhances the potential viewership to a wider group of audience, thereby providing significant benefits for broadcasters, teams and sports franchises. Real-time contextual overlays for live broadcast feeds are traditionally done by inserting and presenting contextual information relevant with the potential viewers to augment viewership. However, for sporting events, it requires complex data tracking and analysis to present contextual interactive content in real-time to actively engage the audience with the live broadcast feed. Hence, there is a need for a system and method for analyzing the live video broadcast stream of the sporting event to deliver real-time contextual interactive content for the audience.

Real-time motion capturing and object tracking is indispensable when it comes to analyzing sporting events. The major aspect in analyzing the live broadcast feed of the sporting event is the recognition of the players in real-time by actively tracing and tracking the players over time to get meaningful insights before presenting it to the audience. Motion capture methods using optical systems, various sensors to measure three-dimensional (3D) location of the organs of the players and using various pattern recognition techniques are existing in the prior art. However, they require a complex system comprising an array of sensors and dedicated hardware to identify and locate the measurements accurately. Further, this makes it more difficult to perform analytics and deliver the contextual interactive content with accuracy in real-time on the live broadcast feed. Hence, there is a need for a system and method for analyzing the live video broadcast stream of the sporting event to recognize players in a multifaceted technique to deliver contextual interactive content for the audience.

In a sporting event, the scene is mostly dynamic as the players maneuver themselves alongside other objects based on the nature of the game and circumstances. The existing tracking technologies are inclined towards providing qualitative data on the players and objects but this requires sophisticated techniques and manual efforts to bring the contextual interactive content onto the live broadcast feed. However, the accuracy of the data is not certain and effective. Systems using numerous cameras, sensors and identifiers are used to fetch the useful information. However, these techniques require cumbersome solutions for performing analytics to extract the contextual interactive content from the acquired data which further increases the cost and time spent. Optical 3D measuring techniques fail to provide accurate data due to insufficient viewing angles and distortions as a result of dynamic images. Aforementioned drawbacks lead to aggravation of complications in performing analytics to retrieve useful insights and metrics. Hence, there is a need for a system and method for analyzing the live video broadcast stream of the sporting event to perform accurate sports analytics to deliver contextual interactive content with lot of insights and metrics for the audience.

The live events usually generate significant revenue for the broadcasting companies and advertisers. When live events such as sports are augmented with contextual interactive content, it will extend their business further followed by higher revenue generation. Sports teams perform lot of analytics to conduct studies on their players and their games to formulate strategies and decisions using extraction of accurate data and an advanced analytics module. Similarly, the broadcasting companies seek such techniques to augment the monetization potential of the live broadcast feed. The audiences for sporting events expect more engagement with the game and hence there is a need for a system and method for analyzing the live video broadcast stream of the sporting event to deliver more contextual interactive content in real-time. Traditional techniques require complex hardware for implementation and additional cameras either in the playing field/court or elsewhere are needed to capture the data which leads to expensive system requirements.

A live video broadcast stream consists of a series of frames. Frames per second (fps) indicates the number of frames that exist in a timeframe of 1 second. The duration of a single frame is referred to as frame persistence duration or frame duration (1000 ms/fps). For example, in a 25 fps video, each second will consist of 25 frames and each frame will persist on the screen for a total of 1000/25=40 ms. To provide contextual interactive content to the audience in real-time, all the processing activities should occur within this timeframe in order keep up with the live broadcast feed. Otherwise, by the time one frame is processed, subsequent frames will be lost. Hence, there is a long felt but unresolved need for a system and a method for analyzing the live video broadcast stream within the frame persistence duration or the frame duration.

Hence, there is a long felt but unresolved need for a system and a method for analyzing a live video broadcast stream of a sporting event to deliver contextual interactive content for the audience in real-time to enhance their viewership and augment the monetization potential of existing content for the broadcasting companies and advertisers.

SUMMARY OF THE INVENTION

This summary is provided to introduce a selection of concepts in a simplified form that are further disclosed in the detailed description of the invention. This summary is not intended to determine the scope of the claimed subject matter.

The sports analytics system and the method disclosed herein address the above recited need for analyzing a live video broadcast stream of a sporting event to deliver contextual interactive content for the audience in real-time to enhance their viewership and augment the monetization potential of existing content for the broadcasting companies and advertisers. Furthermore, the sports analytics system and the method disclosed herein exploits the phase difference between real time messaging protocol stream and a hypertext transfer protocol live stream to complete the processing activities. The sports analytics system incorporates a computer server for analyzing a live video broadcast stream of a sporting event. The sport analytics system comprises a video demuxer, a non-transitory computer readable storage media, and at least one processor. The video demuxer receives the live video broadcast stream of the sporting event from a video capture device and splits the received live broadcast stream into a real time messaging protocol stream and a hypertext transfer protocol live stream. The non-transitory computer readable storage media stores computer program instructions defined by modules of the sport analytics system. The processor is communicatively coupled to the non-transitory computer readable storage media, and the processor is configured to execute the computer program instructions defined by the modules of the sport analytics system. An analytics module analyzes the real time messaging protocol stream within a predetermined time interval. The predetermined time interval corresponds to a phase difference between the real time messaging protocol stream and the hypertext transfer protocol live stream. The predetermined time interval is less than a frame persistence time of a frame. The analytics module comprises a detection module, a tracking module, a recognition module, a comparison module and a transmission module. The detection module detects one or more persons present in a frame of the real time messaging protocol stream, using one or more cues selected from a first set of cues comprising a facial detection, a head detection, a person detection, and a jersey number detection based on availability of the first set of cues.

The tracking module tracks the detected persons in the frame, by analyzing one or more preceding frames of the real time messaging protocol stream. The recognition module recognizes the tracked persons in the frame using one or more cues selected from a second set of cues comprising a facial recognition, a person recognition, a jersey recognition, a live score feed of the sporting event, and a commentary of the sporting event based on availability of the second set of cues. The jersey recognition comprises one or more of jersey number classification and team recognition. Individual weights are assigned to each of the facial recognition, the person recognition, and the jersey recognition when the facial recognition, the person recognition, and the jersey recognition are performed in the frame. The individual weights are determined based on clarity of each person recognized in the frame. If any of the facial recognition, the person recognition, and the jersey recognition is unavailable, the recognition module uses one or more of the live score feed and the commentary for the identification of one or more players in the frame. The comparison module identifies one or more players in the frame by comparing the assigned weights for each of the recognized persons with pre-existing data of all players. The transmission module transmits the hypertext transfer protocol live stream and analysis data comprising contextual interactive content of the identified players to a client application provided on a user device by the sports analytics system within the predetermined time interval. The live video broadcast stream is transformed into an interactive video comprising the contextual interactive content of the identified players. The client application comprises an interaction module for providing user interaction with the interactive video.

The contextual interactive content of the identified players is displayed on the user device without the contextual interactive content of the identified players overlapping existing graphics of the hypertext transfer protocol live stream. The contextual interactive content of the identified players comprises a dynamic display of one or more of a scorecard, a player information, and match statistics and the contextual interactive content of the identified players can be customized and shared on social media. The user can interact with one or more of the identified players in the interactive video. The sports analytics system augments the implementation of on-demand enhanced content by recognizing players of interest and displaying the key metrics of the recognized player such as player's bio, season, career statistics, social media posts and related videos for the user device. The sports analytics system also provides rich content for users to see the head-to-head comparison of statistics of the players of interest. The sports analytics system further helps to engage the users with the live video broadcast stream by embedding game experience and augments the monetization potential of the existing content for various broadcasting companies and advertisers.

BRIEF DESCRIPTION OF THE DRAWINGS

The foregoing summary, as well as the following detailed description of the invention, is better understood when read in conjunction with the appended drawings. For illustrating the invention, exemplary constructions of the invention are shown in the drawings. However, the invention is not limited to the specific methods and components disclosed herein.

FIG. 3 illustrates a method for analyzing a live video broadcast stream of a sporting event.

DETAILED DESCRIPTION OF THE INVENTION

Figure 1:
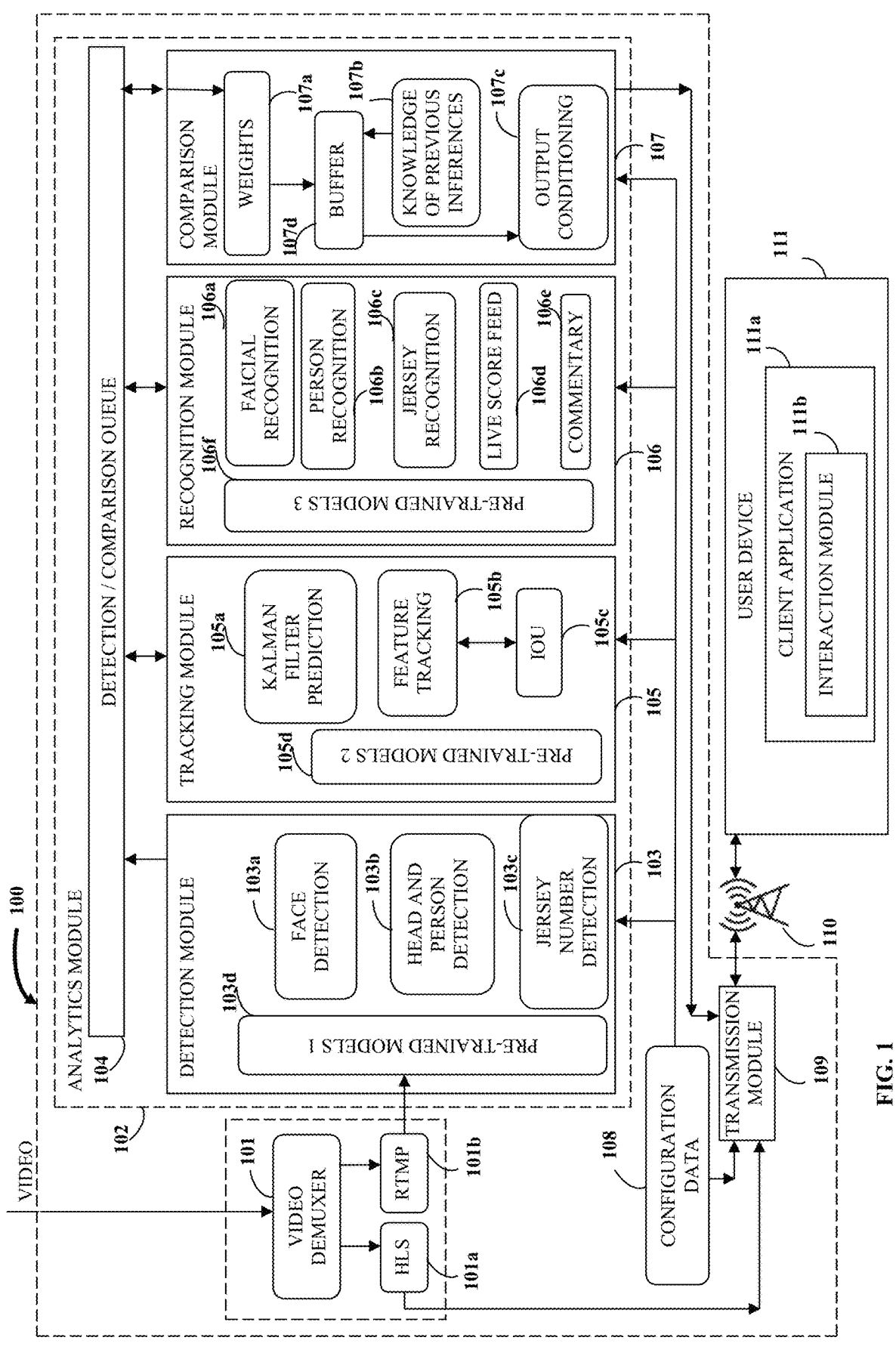
FIG. 1 exemplarily illustrates a sports analytics system incorporating a computer server for analyzing a live video broadcast stream of a sporting event.

FIG. 1 exemplarily illustrates a sports analytics system 100 incorporating a computer server for analyzing a live video broadcast stream of a sporting event. As used herein, "live video broadcast stream" refers to a live feed of a video broadcast of a sporting event. The sports analytics system 100 comprises a video demuxer 101, a non-transitory computer readable storage media 202, and at least one processor 201 as exemplarily illustrated in FIG. 2. The video demuxer 101 receives the live video broadcast stream of the sporting event from a video capture device (not shown) and splits the received live broadcast stream into a real time messaging protocol stream 101b and a hypertext transfer protocol live stream 101a. The real time messaging protocol stream 101b is routed to an analytics module 102 for analyzing the sporting event. The hypertext transfer protocol live stream 101a is encoded for broadcasting to any consumer device platforms such as a web, any iOS device, any android device, or other integrated platforms. Furthermore, an offset based frame synchronization logic is implemented to achieve frame level synchronization across the split streams. The non-transitory computer readable storage media 202 stores computer program instructions defined by modules of the sports analytics system 100. The processor 201 is communicatively coupled to the non-transitory computer readable storage media 202 and configured to execute the computer program instructions defined by the modules of the sports analytics system 100. The analytics module 102 analyzes the real time messaging protocol stream 101b within a predetermined time interval. The predetermined time interval corresponds to a phase difference between the real time messaging protocol stream and the hypertext transfer protocol live stream. The predetermined time interval is less than a frame persistence time of a frame. The analytics module 102 comprises a detection module 103, a detection/comparison queue 104, a tracking module 105, a recognition module 106, a comparison module 107, configuration data module 108 and a transmission module 109.

Figure 4A:
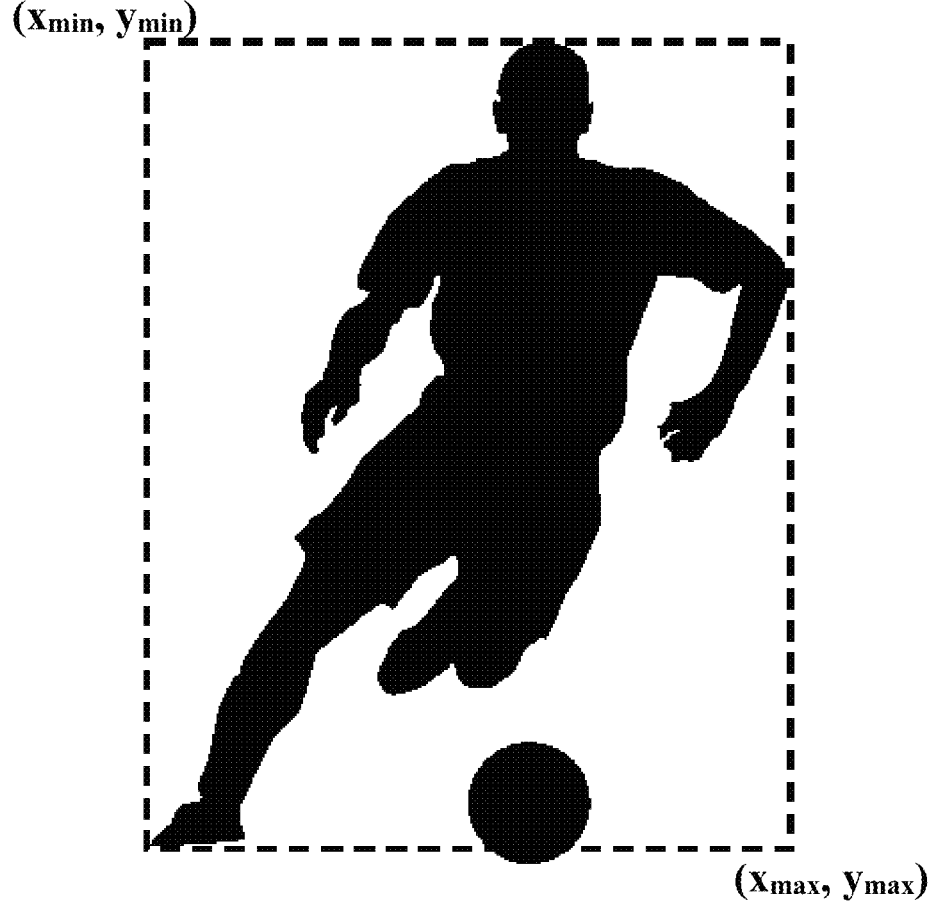
FIG. 4A exemplarily illustrates a person detection in a frame of a hypertext transfer protocol live stream.
Figure 4B:
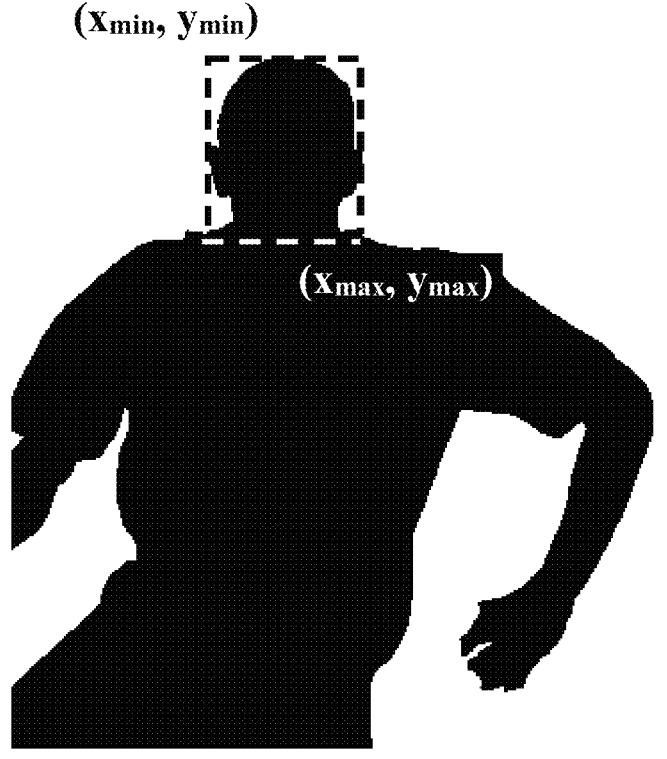
FIG. 4B exemplarily illustrates a head detection in a frame of a hypertext transfer protocol live stream.
Figure 4C:
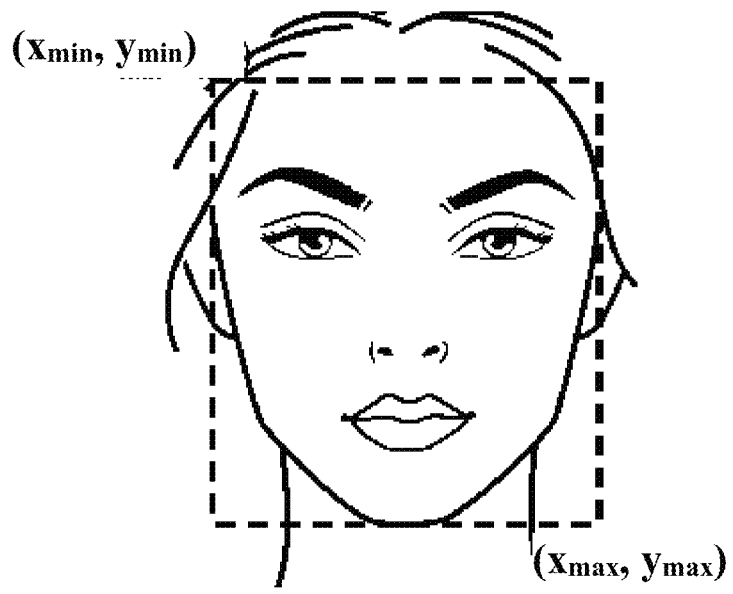
FIG. 4C exemplarily illustrates a face detection in a frame of a hypertext transfer protocol live stream.

The detection module 103 detects one or more persons present in a frame of the real time messaging protocol stream 101b, using one or more cues selected from a first set of cues comprising a facial detection 103a, a head detection 103b, a person detection 103b, and a jersey number detection 103c based on availability of the first set of cues. As used herein, "jersey" refers to any type of garment worn by the persons in the frame. The sports analytics system 100 is capable of detecting the persons in the frame from various angles and orientations. The detection module 103 using a first set of pre-trained models 103d to detect various cues in the frame. The facial detection 103a comprises detecting faces of the persons in the frame and creating bounding boxes around the detected faces such that the faces are tightly cropped by the bounding box as illustrated in FIG. 4C. The person detection 103b comprises detecting bodies of the persons in the frame in various complex situations such as when the body of the person is either partially visible or fully visible, or when the body of the person overlaps with another person's body. The person detection 103b comprises creating bounding boxes around all detected bodies of people in the frame as illustrated in FIG. 4A.

Figure 4D:
FIG. 4D exemplarily illustrates a jersey number detection in a frame of a hypertext transfer protocol live stream.
Figure 4E:
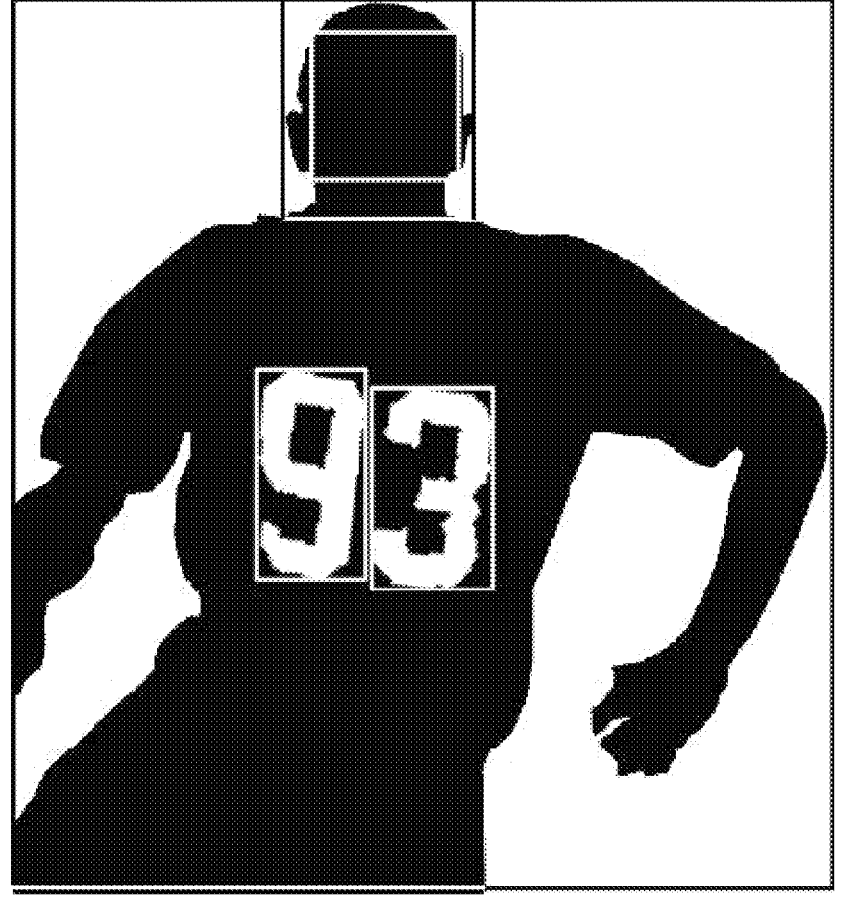
FIG. 4E exemplarily illustrates a person detection, a head detection, a face detection, a jersey number detection, and their association in a frame of a hypertext transfer protocol live stream.

Similarly, the head detection 103b comprises detecting heads of the persons in the frame in situations like head either partially visible or head fully visible or head in various orientations and poses. For example, the person's head may be seen from behind, from the front, from the bottom or top or from either side. In some cases the person's head may overlap with another person's head. The output of the head detection 103b comprises creating bounding boxes around all the detected heads in the frame. Each detected head is associated with a body and the bounding box is made as close to the head as possible and inside the associated person's bounding box, as illustrated in FIG. 4B. The jersey number detection 103c comprises detecting jersey numbers on one or more of back, front, shoulders, and other locations on the jersey of the persons in the frame as illustrated in FIG. 4D. Furthermore, a jersey number detection 103c comprises detecting each digit on the jersey individually (even if they act as a part of a multi digit number) using a pre-trained model 103d. The hierarchy of the detection sequence is a face bounding box contained within a head bounding box which in turn is contained within a person bounding box as illustrated in FIG. 4E. The output of the detection module 103 is fed into a shared detection/comparison queue 104 for further processing.

Figure 5:
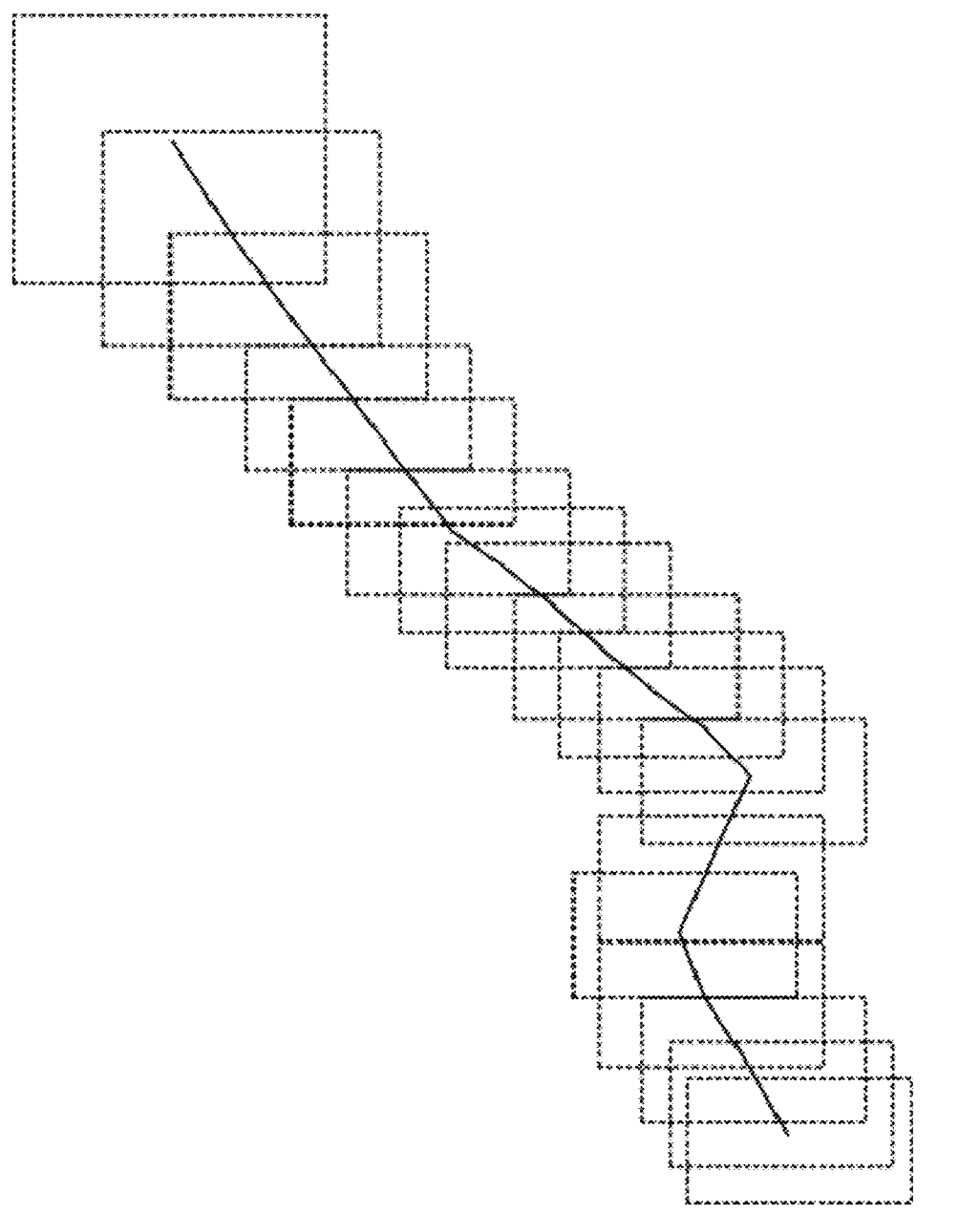
FIG. 5 exemplarily illustrates tracking of a detected person in a frame, by analyzing one or more preceding frames of a real time messaging protocol stream.

The tracking module 105 tracks the detected persons in the frame, by analyzing one or more preceding frames of the real time messaging protocol stream 101b as illustrated in FIG. 5. The tracking module 105 associates the detected person across a contiguous collection of frames, essentially capturing the movement of that person. Furthermore, the tracking module 105 employs a hybrid tracking algorithm to track the detected persons in the frame using a multi-object tracking approach. The detected persons are tracked in the frame continuously in real-time and the frames are processed independently to identify numerous objects in the particular frame. The hybrid tracking algorithm implements a learning technique to track the detected persons using Kalman filter prediction 105a, feature tracking 105b and Intersection Over Union (IOU) 105c using a second set of pre-trained models 105d.

The recognition module 106 recognizes the tracked persons in the frame using one or more cues selected from a second set of cues comprising a facial recognition 106a, a person recognition 106b, a jersey recognition 106c, a live score feed of the sporting event 106d, and a commentary of the sporting event 106d based on availability of the second set of cues. The recognition involves processes such as classification, extraction of embeddings, computation of similarity features using metrics like cosine distance, square euclidean distance, etc. Each recognition has a confidence value associated with it and only if the confidence value of a predicted recognition exceeds a previously set threshold confidence value, the prediction is considered. This decreases the possibility of false positives, and makes the recognition more accurate.

Figure 6A:
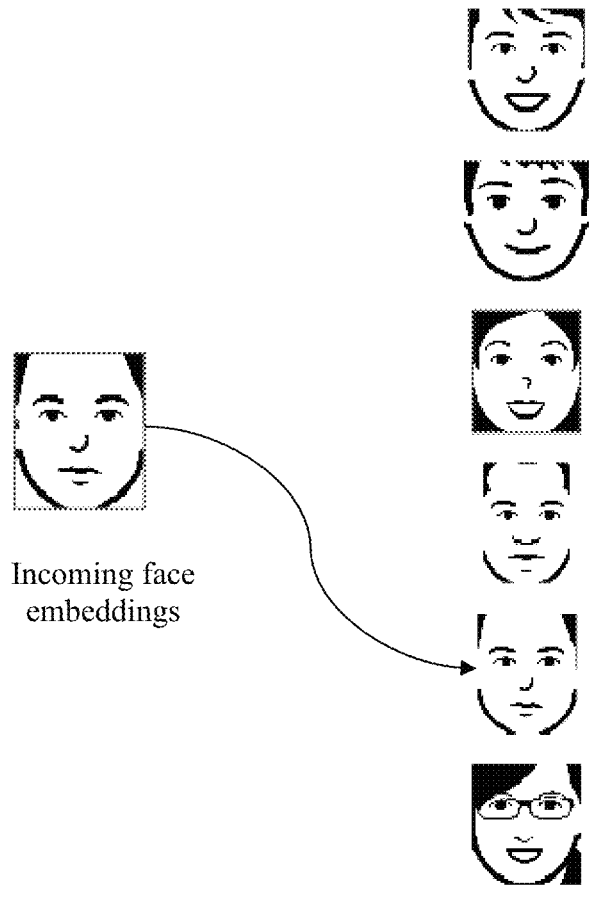
FIG. 6A exemplarily illustrates a face recognition using extracted embeddings.
Figure 6B:
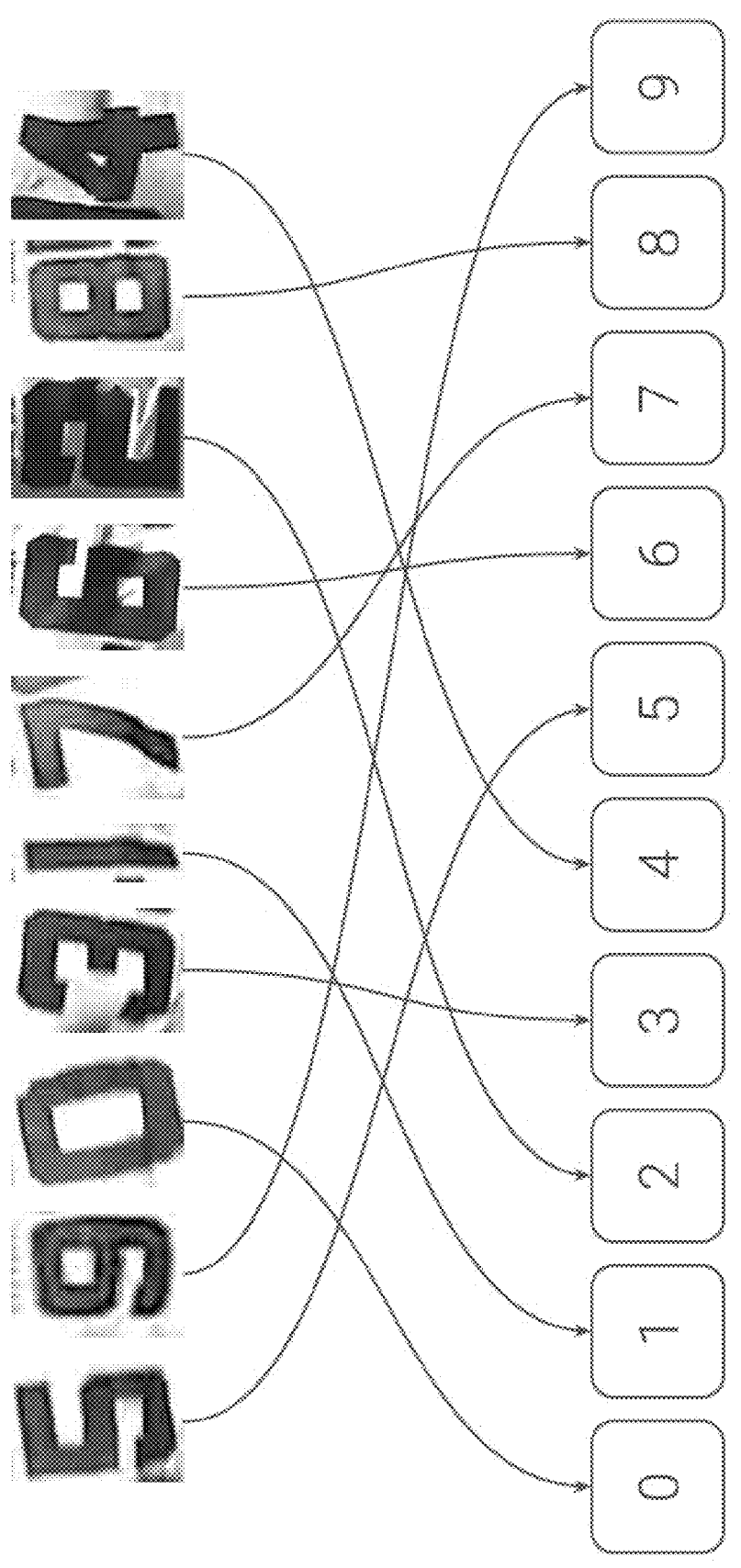
FIG. 6B exemplarily illustrates a jersey number classification.
Figure 6C:
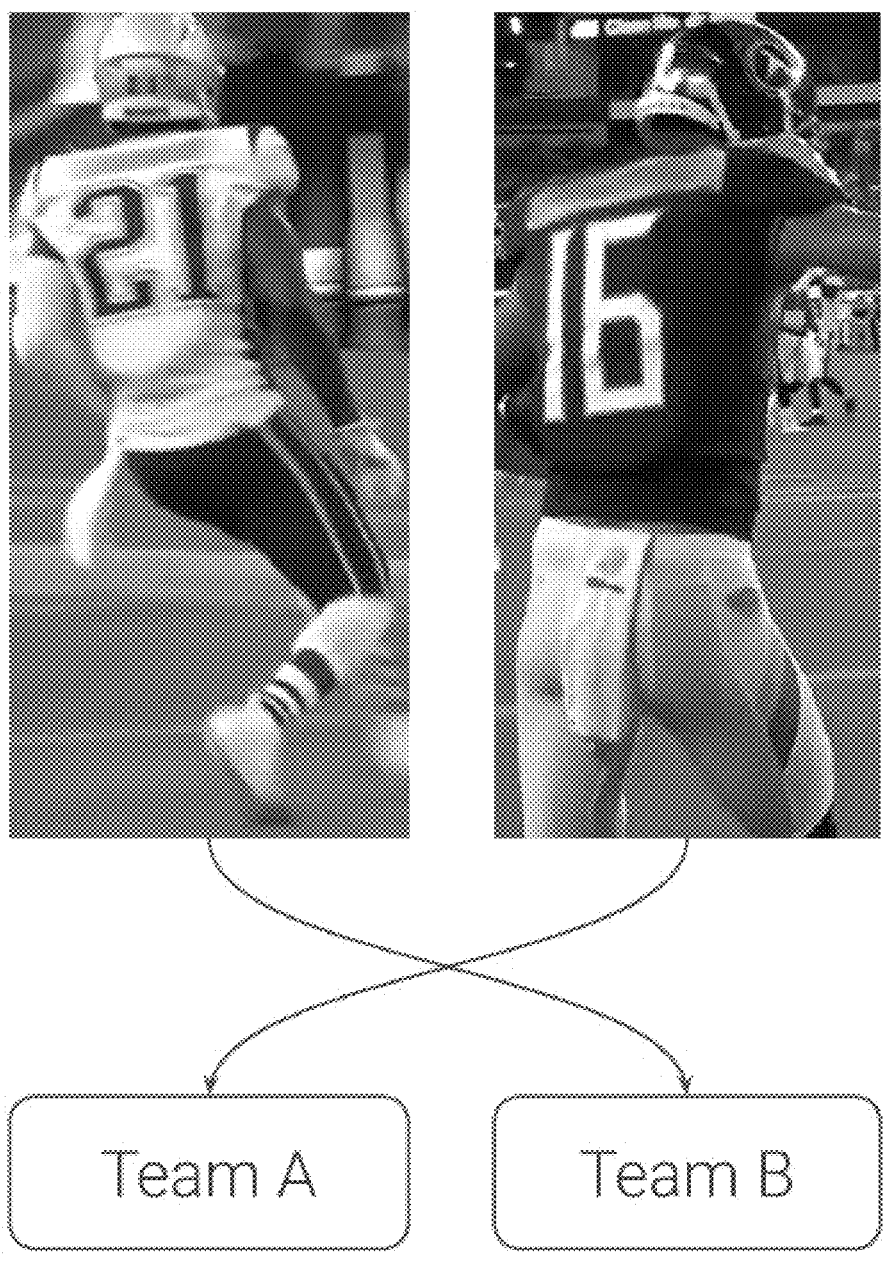
FIG. 6C exemplarily illustrates a team recognition by extracting embeddings.

The facial recognition 106a comprises extracting embeddings from a detected face and they are compared to another array of embeddings obtained from a previously collected static set of high resolution images as illustrated in FIG. 6A. The facial recognition 106a is based on similarity between the embeddings. Furthermore, parameters such as pose, size of face, colour of skin, and orientation towards camera do not affect the facial recognition 106a. The jersey recognition 106c comprises one or more of jersey number classification and team recognition. The jersey number classification is used to classify each of the detected digits of the jersey into one or more classes as illustrated in FIG. 6B. Furthermore, multiple digits that belong to the same jersey number are associated with each other based on either their relative position or font. The jersey number classification maintains a queue system to minimize the possibility of isolated cases of false positives. The team recognition comprises extracting embeddings from the person bounding box and comparing against an array of previously computed embeddings as illustrated in FIG. 6C. The team recognition uses jersey colour as the distinguishing parameter and performs recognition based on the similarity between the embeddings.

Individual weights are assigned to each of the facial recognition 106*a*, the person recognition 106*b*, and the jersey recognition 106*c* when the facial recognition 106*a*, the person recognition 106*b*, and the jersey recognition 106*c* are performed in the frame. The individual weights are determined based on clarity of each person recognized in the frame. The recognitions predicted by the recognition module 106 have an associated confidence measure based on which a final inference is made. Then the recognitions are then pushed to the detection/comparison queue 104 where the predictions with a low confidence measure are retained to reflect on future decisions. As used herein, "individual weights" refers to a score generated for the detection of one or more of the second set of cues. For example, the sports analytics system 100 actively recognizes the tracked persons in the frame of a live cricket video and assigns individual weights to each one of them depending on one or more of the second set of cues determined for the persons in the frame.

Figure 6D:
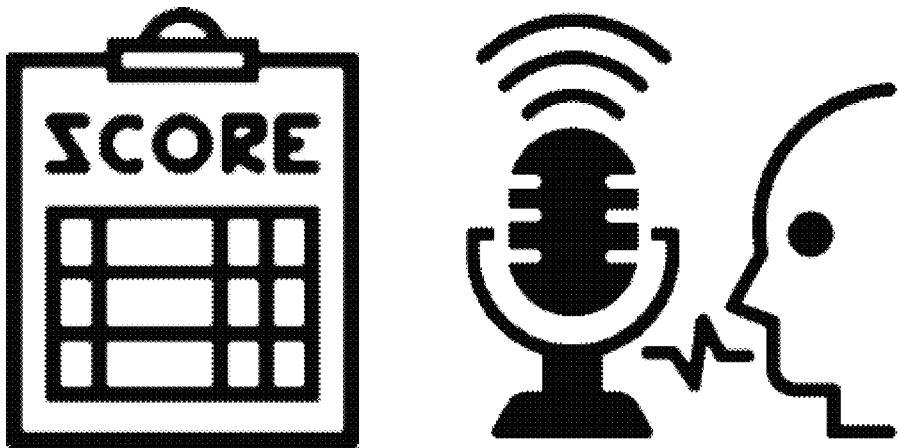
FIG. 6D exemplarily illustrates a live score feed and a commentary for identifying one or more players in a frame.

If any of the facial recognition 106*a*, the person recognition 106*b*, and the jersey recognition 106*c* is unavailable, the recognition module 106 uses one or more of the live score feed 106*d* and the commentary 106*e* for identifying one or more players in the frame as illustrated in FIG. 6D. The recognition module 106 uses a third set of pre-defined models 106*f* to perform recognition. For example, when a player A exists in the frame wherein the jersey number is slightly occluded but the face is clearly visible, the weightage given to the "face recognition" is higher than that given to the "jersey number recognition". On the other hand, when a player B exists in the frame wherein the jersey number is clearly visible and the face is slightly occluded, the weightage given to the "jersey number recognition" is higher than that of the "face recognition". Furthermore, the sports analytics system 100 backfills the detections using player tracking. For example, if a person's detection cues such as face detection 103*a*, and jersey number detection 103*b*, are not visible to provide enough confidence to uniquely detect the player at some point of time "t" in a particular track, but become available at some other point of time "t+n" in the same track, using backfilling and tracking, the system is able to identify the person throughout the extant of the track as illustrated in FIG. 5.

The comparison module 107 identifies one or more players in the frame by comparing the assigned weights for each of the recognized persons with pre-existing data of all players. The detections, tracks, and recognitions, along with various confidence levels extracted from the detection module 103, tracking module 105 and recognition module 106 are fed into the decision/comparison queue 104. The sports analytics system 100 uses the extracted output from the independent modules to make the final inference to greatly reduce the false positives predicted to improve the system output. In terms of player recognition, each sport comprises its own characteristics in terms of markers available for the various modules to use in order to perform recognitions. For example, American Football players' faces are not available as markers to recognize as the players wear helmets, while Golfers do not have numbers on their playing uniforms. So the system considers weights 107*a* of various available cues that are imperative in the context of recognition of sports players. In addition, the knowledge of previously made inferences 107*b* is also used to arrive at the final prediction and processed in an output monitoring unit 107*c* via a buffer 107*d*.

The sports analytics system 100 processes the output from various modules and generates contextual interactive content within the predetermined time interval. The sports analytics system 100 exploits the phase difference between the real time messaging protocol stream and hypertext transfer protocol live stream to deliver contextual interactive content. The predetermined time interval is less than the frame persistence time of the frame. The sports analytics system 100 uses the inherent time-gap in order to service the additional time buffer required by its various modules. Furthermore, cach module in the sports analytics system 100 can be configured with configuration data 108 via a network 110. The configuration data 108 could be at least one of machine learning models, game specific data, video/stream specific data, etc. Furthermore, the configuration data 108 can be updated in real-time during the processing of the real time messaging protocol stream 101*b*. In an embodiment, a dashboard is configured to control and monitor the processes performed by the sports analytics system 100.

The transmission module 109 of the sports analytics system 100 is configured to transmit the hypertext transfer protocol live stream and analysis data comprising contextual interactive content of the identified players to a client application 111*a* provided on a user device 111 by the sports analytics system 100 within the predetermined time interval. In effect the sports analytics system 100 transforms the live video broadcast stream into an interactive video comprising the contextual interactive content of the identified players and makes the interactive video available on the user device 111. The client application 111*a* comprises an interaction module 111*b* for providing user interaction with the interactive video. As used herein, "client application" refers to an application installed on the user device that is used for user interaction. Also, as used herein, "user device" refers to any device used for user interaction, but not limited to, mobile communication devices, cellular phones, personal digital assistants (PDAs), digital cameras, laptop computers, tablet computers, and netbooks.

The contextual interactive content of the identified players is displayed on the user device 111 without the contextual interactive content of the identified players overlapping existing graphics of the hypertext transfer protocol live stream. The contextual interactive content is transmitted as on-demand enhanced content to the live video broadcast stream in real-time to enhance the user interaction and increased viewership. The contextual interactive content of the identified players comprises a dynamic display of one or more of a scorecard, player information, and match statistics and the contextual interactive content of the identified players can be customized and shared on social media. The contextual interactive content of the identified players also includes information about the player, player statistics and player biography. The contextual interactive content of the identified players could be customized according to the requirements and optionally shared on any social media platforms. In some embodiments, the contextual interactive content of the identified players can be customized to a particular season and corresponding player statistics in that season. In another embodiment, one or more social media posts of the players and teams are provided as on-demand enhanced content. In another embodiment, head-to-head statistics of customized players are provided as rich content especially for the users to enhance their viewing interaction. The interaction module 111*b* provides rich content for the users in real-time, more engagement and a game experience platform for interested users and augments monetization potential of existing content for various broadcasting companies and advertisers. The user can interact with one or more of the identified players in the interactive video. As used herein, "user" refers to any end user of the application, for example, a sports fan watching a game on one of the aforementioned devices.

In an embodiment, the sports analytics system 100 provides recognition driven interactivity to enable viewers to get information about the identified players. The sports analytics system 100 allows the user to interact with the identified player on the screen of the user device. For example, the when a player is identified, visual cues such as an associated icon and/or marker is displayed on the screen such that the user is notified on the recognized player and thereby opening the gateway for interaction. The contextual interactive content is customized based on the detection of the cues to suit the requirements of the user. In another embodiment, the sports analytics system 100 allows the users to interact with more than one recognized player in the frame by notifying them with an option to choose the interested player from the identified players. For example, if multiple players are recognized at any point of time, an array of associated icons and/or markers are displayed so that the user is able to choose any player of interest for interaction.

The sports analytics system 100 provides user interactivity with and around the existing graphical assets in the hypertext transfer protocol live stream 101*a*. The sports analytics system 100 dynamically overlays the contextual interactive content layout around the graphics embedded in the hypertext transfer protocol live stream 101*a*. As used herein, "graphics" refers to any information such as scorecards, player statistics, player information, etc. displayed along with the hypertext transfer protocol live stream 101*a*. The sports analytics system 100 recognizes the co-ordinates of graphical assets on the screen that is part of the hypertext transfer protocol live stream 101*a* and ensures that the additional overlays do not overlap with each other so as to provide a good user experience. Furthermore, the sports analytics system 100 provides extensive information for the user as on-demand contextual interactive content on top of the overlaid graphics in the hypertext transfer protocol live stream 101*a*. For example, when a user clicks on the scorecard, an extensive version of the scorecard opens up to disclose a variety of information which was previously unavailable. Further, users can also interact and customize the extensive version of the scorecard such that the user will have access to a larger variety of on-demand contextual interactive content in real-time.

Figure 2:
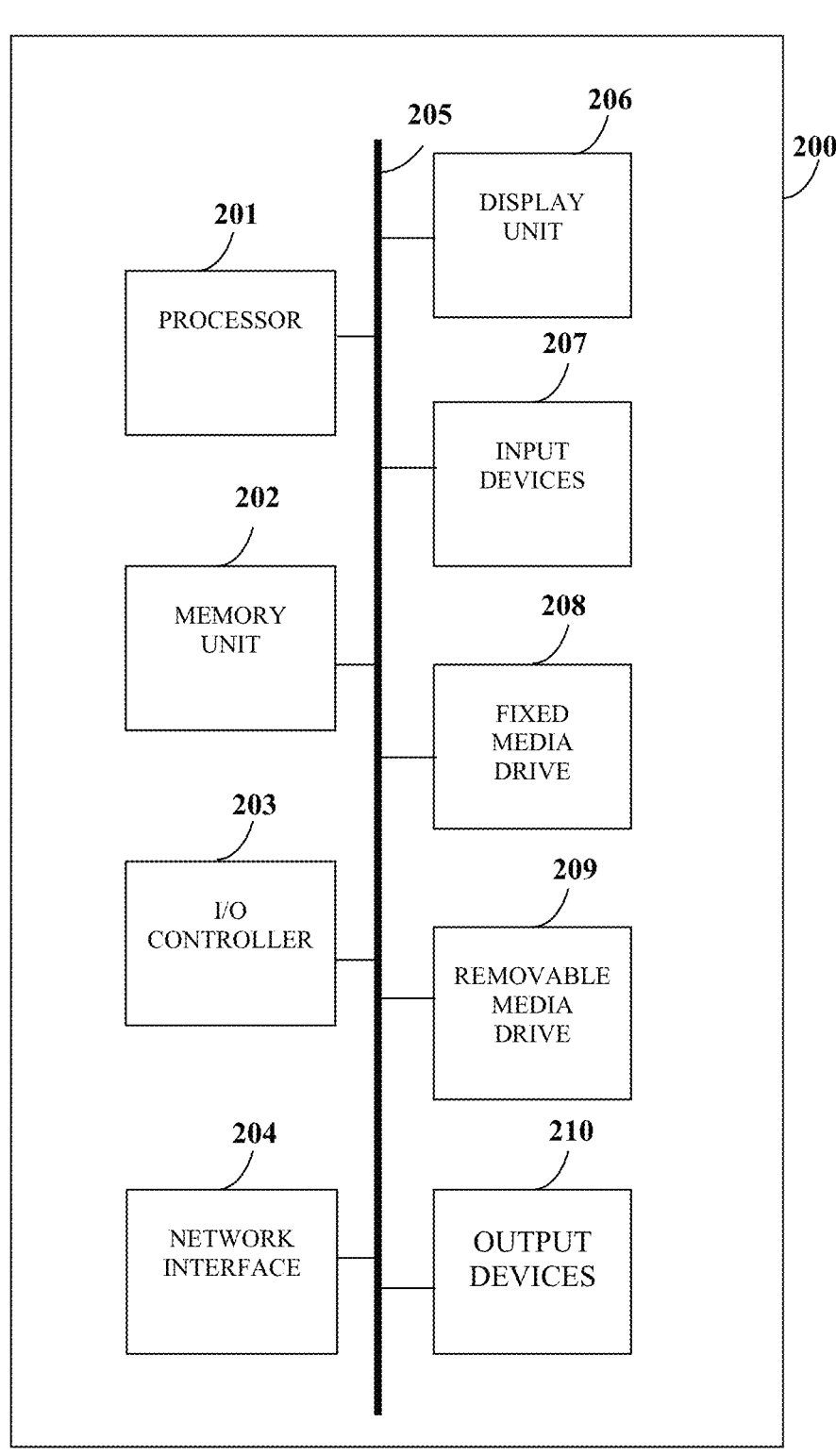
FIG. 2 exemplarily illustrates the architecture of a computer server employed by a sports analytics system for analyzing a live video broadcast stream of a sporting event.

FIG. 2 exemplarily illustrates the architecture of a computer server employed by a sports analytics system 100 for analyzing a live video broadcast stream of a sporting event. The computer system 200 comprises, for example, a processor 201, a non-transitory computer readable storage medium such as a memory unit 202 for storing programs and data, an input/output (I/O) controller 203, a network interface 204, a data bus 205, a display unit 206, input devices 207, a fixed media drive 208, output devices 210, etc. The computer server 200 may optionally comprise a removable media drive 209 for receiving removable media. The processor 201 retrieves instructions for executing the modules, for example, 103, 104, 105, 106, 107, 108 and 109, of the sports analytics system 100 from the memory unit 202.

FIG. 3 illustrates a method for analyzing a live video broadcast stream of a sporting event. The method disclosed herein employs a sports analytics system 100 comprising at least one processor 201 configured to execute computer program instructions for analyzing a live video broadcast stream of a sporting event. The sports analytics system 100 receives 301, using a video demuxer 101, the live video broadcast stream of the sporting event from a video capturing device. The video demuxer 101 of the sports analytics system 100 splits 302 the live broadcast stream into a real time messaging protocol stream 101*b* and a hypertext transfer protocol live stream 101*a*. The sports analytics system 100 analyzes 303 the real time messaging protocol stream 101*b* within a predetermined time interval. The predetermined time interval comprises a phase difference between the real time messaging protocol stream and the hypertext transfer protocol live stream. The predetermined time interval is less than a frame persistence time of the frame. The sports analytics system 100 detects 303*a* one or more persons present in a frame of the real time messaging protocol stream, using one or more cues selected from a first set of cues comprising a facial detection, a head detection, a person detection, and a jersey number detection based on availability of the first set of cues.

The sports analytics system 100 tracks 303*b* the detected persons in the frame, by analyzing one or more preceding frames of the real time messaging protocol stream. The sports analytics system 100 recognizes 303*c* the tracked persons in the frame using one or more cues selected from a second set of cues comprising a facial recognition 106*a*, a person recognition 106*b*, a jersey recognition 106*c*, a live score feed of the sporting event 106*d*, and a commentary of the sporting event 106*e* based on availability of the second set of cues. The jersey recognition 106*c* comprises one or more of jersey number classification and team recognition. Individual weights are assigned to each of the facial recognition 106*a*, the person recognition 106*b*, and the jersey recognition 106*c* when the facial recognition 106*a*, the person recognition 106*b*, and the jersey recognition 106*c* are performed in the frame. The individual weights are determined based on clarity of each person recognized in the frame. If any of the facial recognition 106*a*, the person recognition 106*b*, and the jersey recognition 106*c* is unavailable, one or more of the live score feed 106*d* and the commentary 106*e* is used for the identification of the one or more players in the frame. The sports analytics system 100 identifies 303*d* one or more players in the frame by comparing the assigned weights for each of the recognized persons with pre-existing data of all players.

The sports analytics system 100 transmits 303*e* the hypertext transfer protocol live stream 101*a* and analysis data comprising contextual interactive content of the identified players to a client application 111*a* provided on a user device 111 by the sports analytics system 100 within the predetermined time interval. Therefore, the live video broadcast stream is transformed into an interactive video comprising the contextual interactive content of the identified players. The contextual interactive content of the identified players is displayed on the user device without the contextual interactive content of the identified players overlapping graphics of the live video broadcast stream of the sporting event. The contextual interactive content of the identified players comprises a dynamic display of one or more of a scorecard, player information, and match statistics and the contextual interactive content can be customized for sharing on the social media. The user can interact with one or more of the identified players in the interactive video.

Figure 7A:
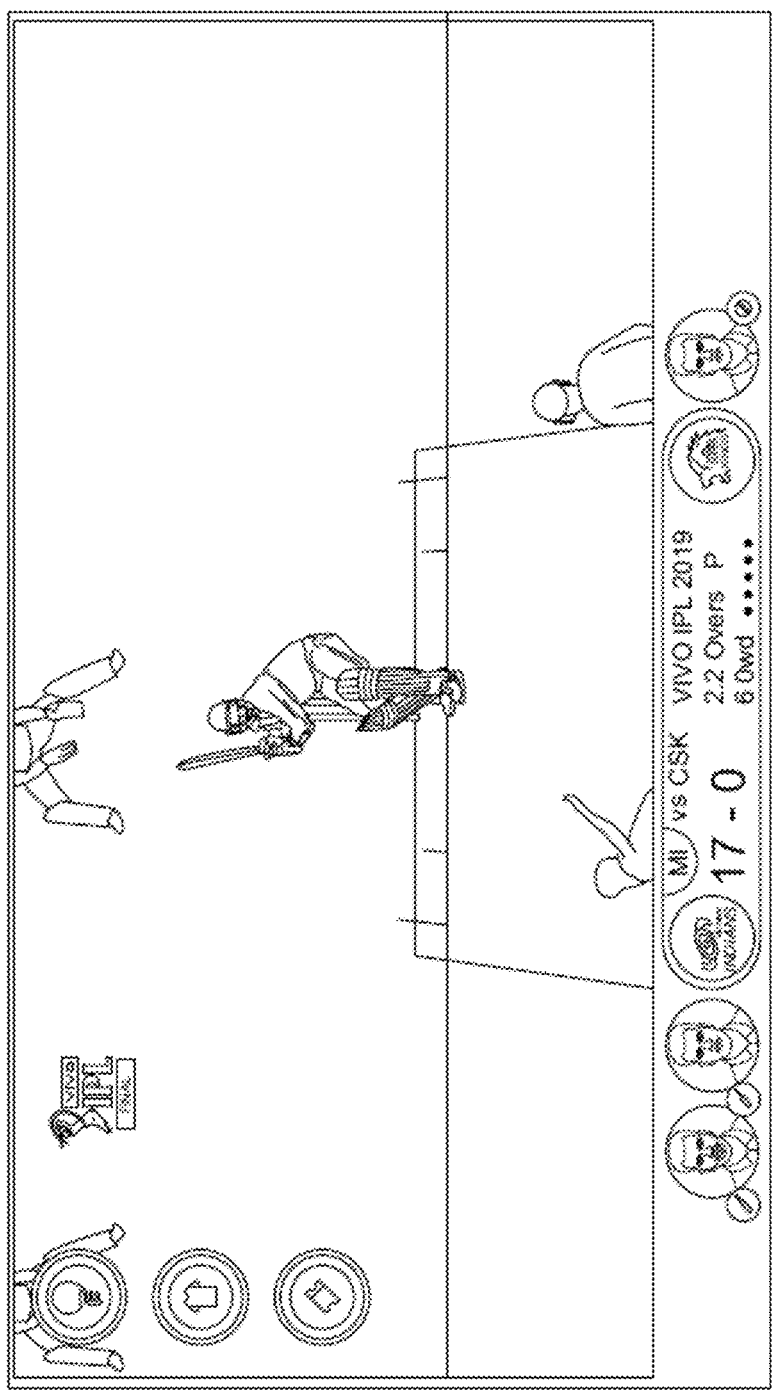
FIGS. 7A-7D exemplarily illustrates a screenshot of an on-demand enhanced contextual interactive content overlaid on a hypertext transfer protocol live stream of a sporting event.
Figure 7B:
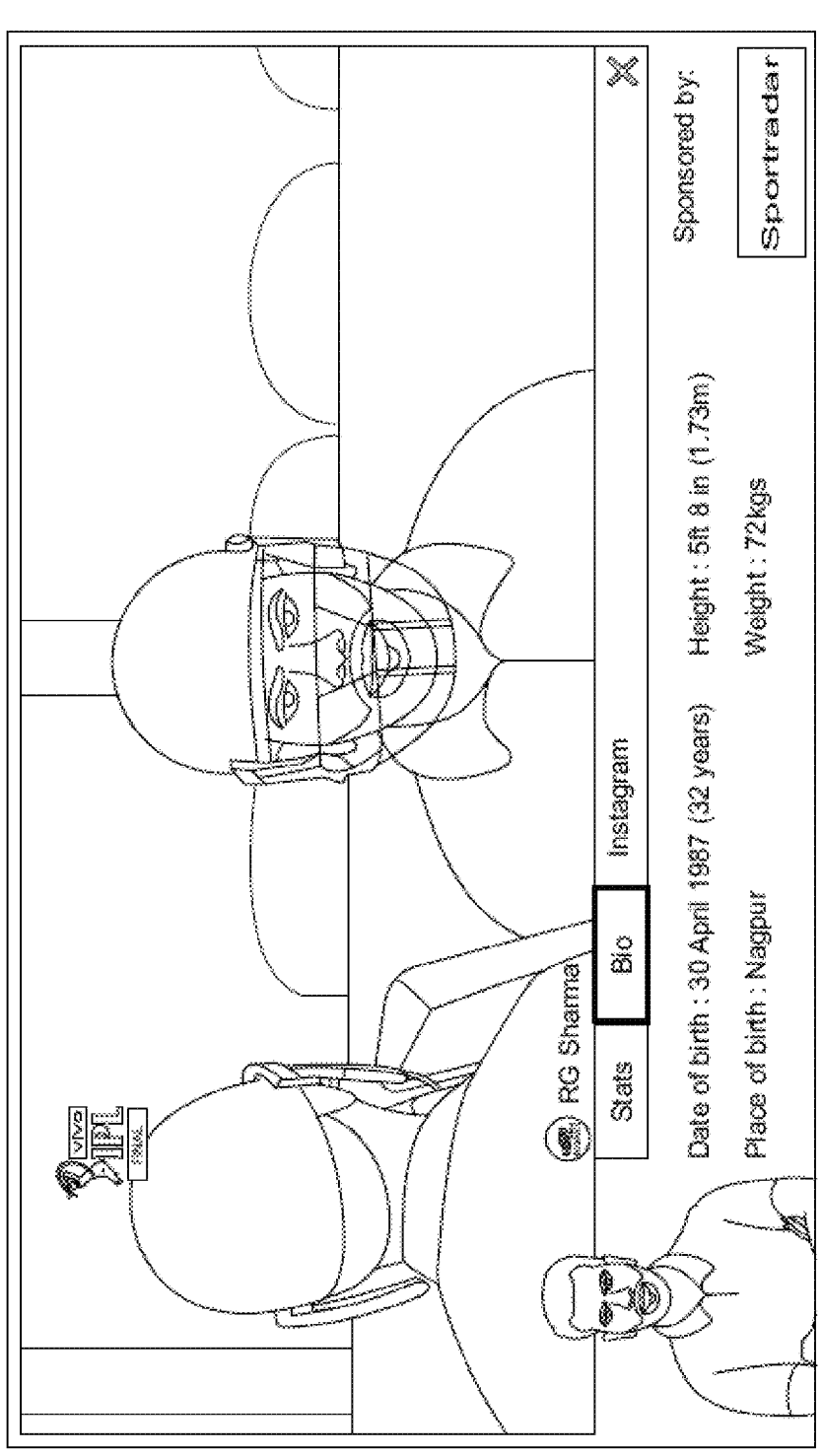
Figure 7C:
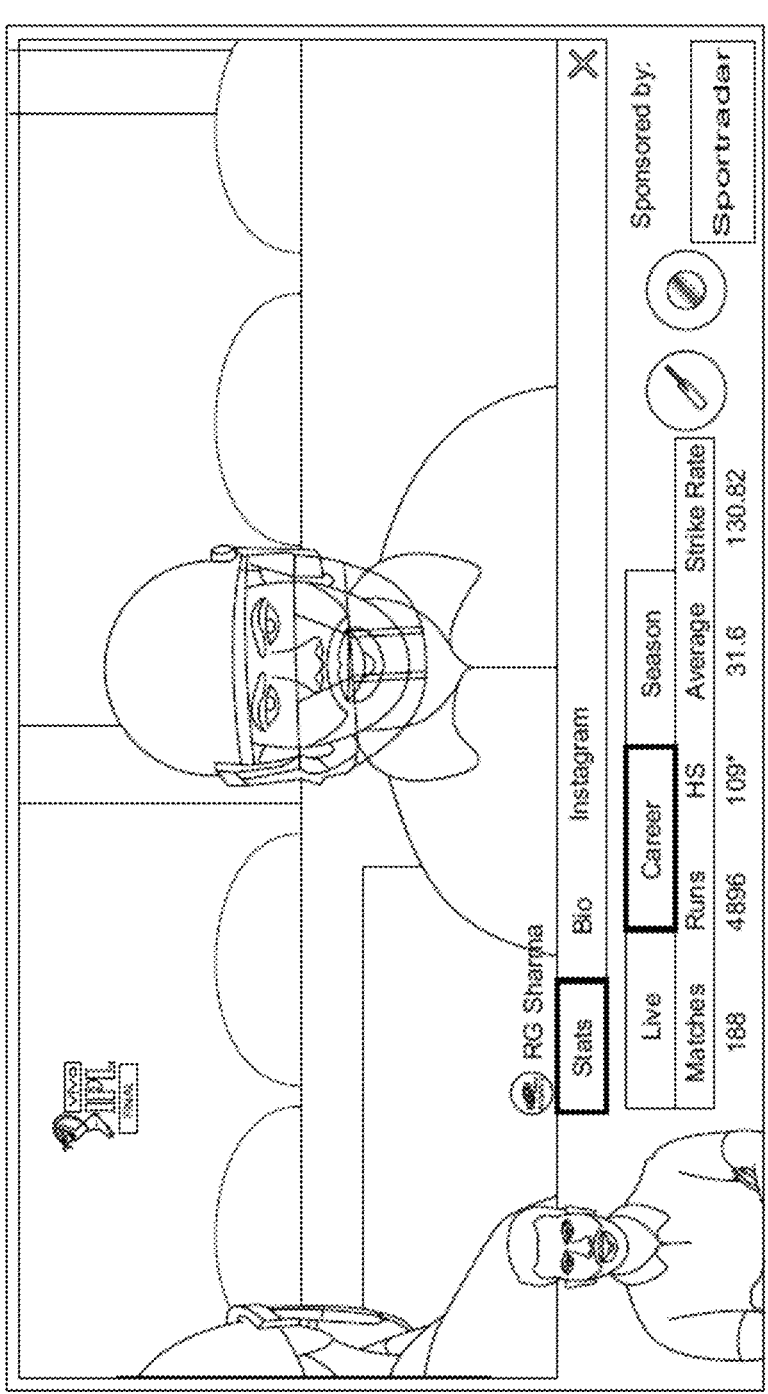
Figure 7D:
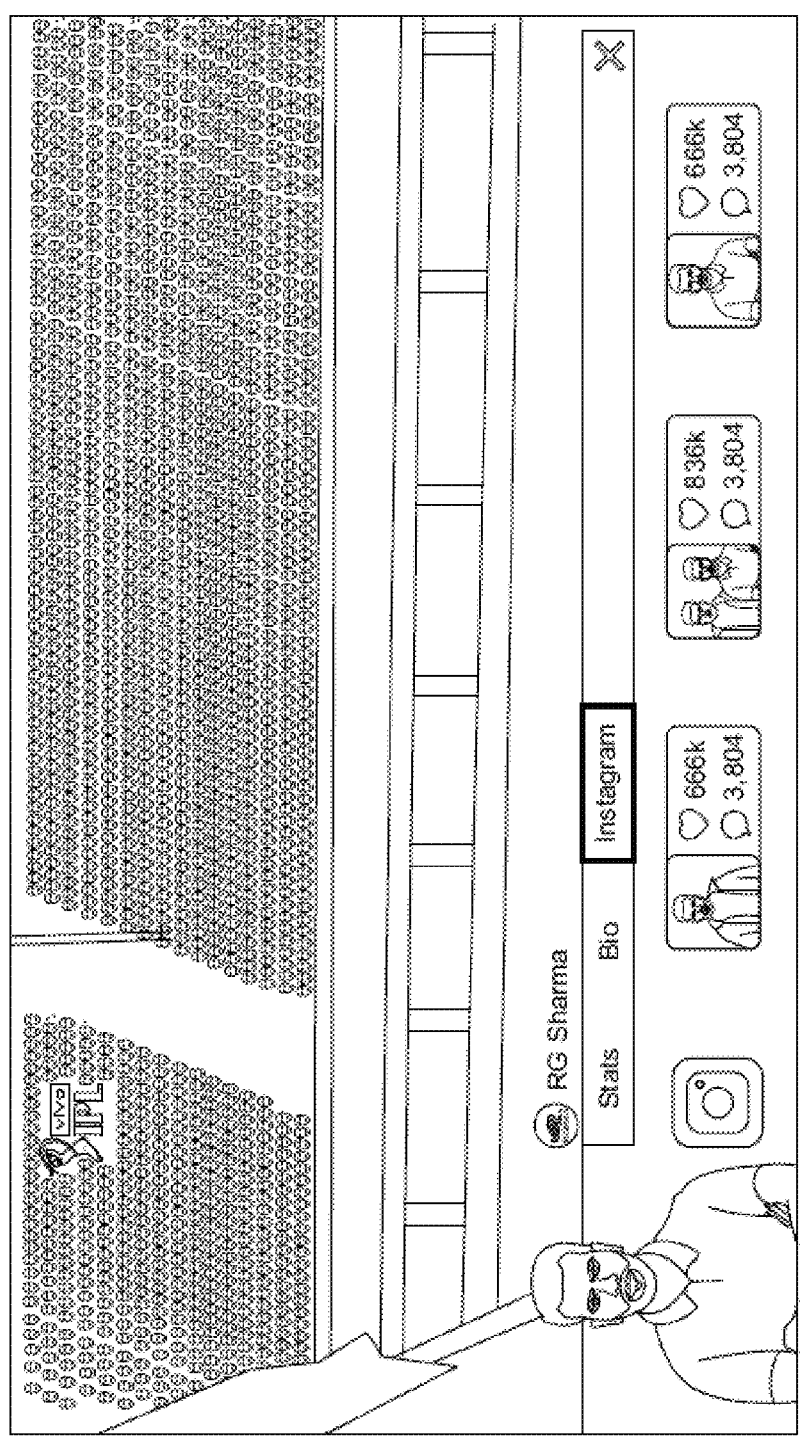

FIGS. 7A-7D exemplarily illustrates a screenshot of an on-demand enhanced contextual interactive content overlaid on a hypertext transfer protocol live stream 101a of a sporting event. The contextual interactive content is displayed without overlapping existing graphics displayed on the hypertext transfer protocol live stream 101a of the sporting event. As used herein, "contextual interactive content" refers to any on-demand enhanced content that is streamed onto the user device 111 in real-time to enhance the user interaction and increased viewership. FIG. 7A illustrates an exemplary screenshot of a rendering of a contextual overlay which renders the contextual interactive content comprising a dynamic display of one or more of a scorecard, player information, and match statistics. FIG. 7B illustrates an exemplary screenshot of a rendering of a biography of the batsman in the cricket game. FIG. 7C illustrates an exemplary screenshot of a rendering of a player statistics of the batsman in the cricket game. The sports analytics system 100 renders the contextual interactive content of the recognized player to display the overall statistics of the player across different formats of the games such as total number of matches played, number of catches taken, total number of runs, strike rate, batting average, etc., The contextual interactive content could be customized according to the requirements and optionally shared on any social media platforms. In some embodiments, the user can get access to player statistics for a particular season. In another embodiment, one or more social media posts of the players and teams are provided as on-demand enhanced content as exemplarily illustrated in FIG. 7D. This includes interactive information of the player such as photos, videos, etc.

Figure 8:
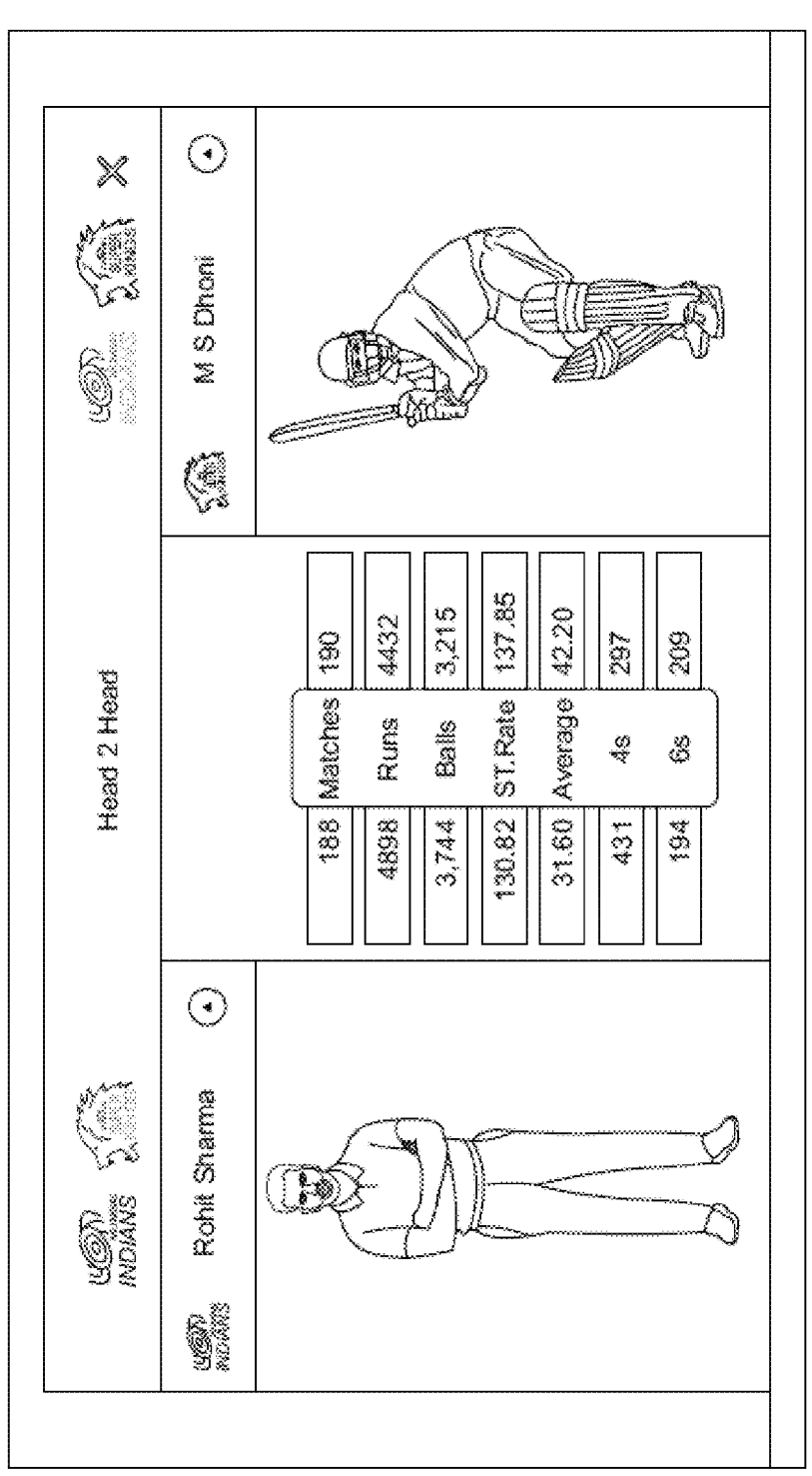
FIG. 8 exemplarily illustrates a screenshot of rich contextual interactive content overlaid on a hypertext transfer protocol live stream.
Figure 9A:
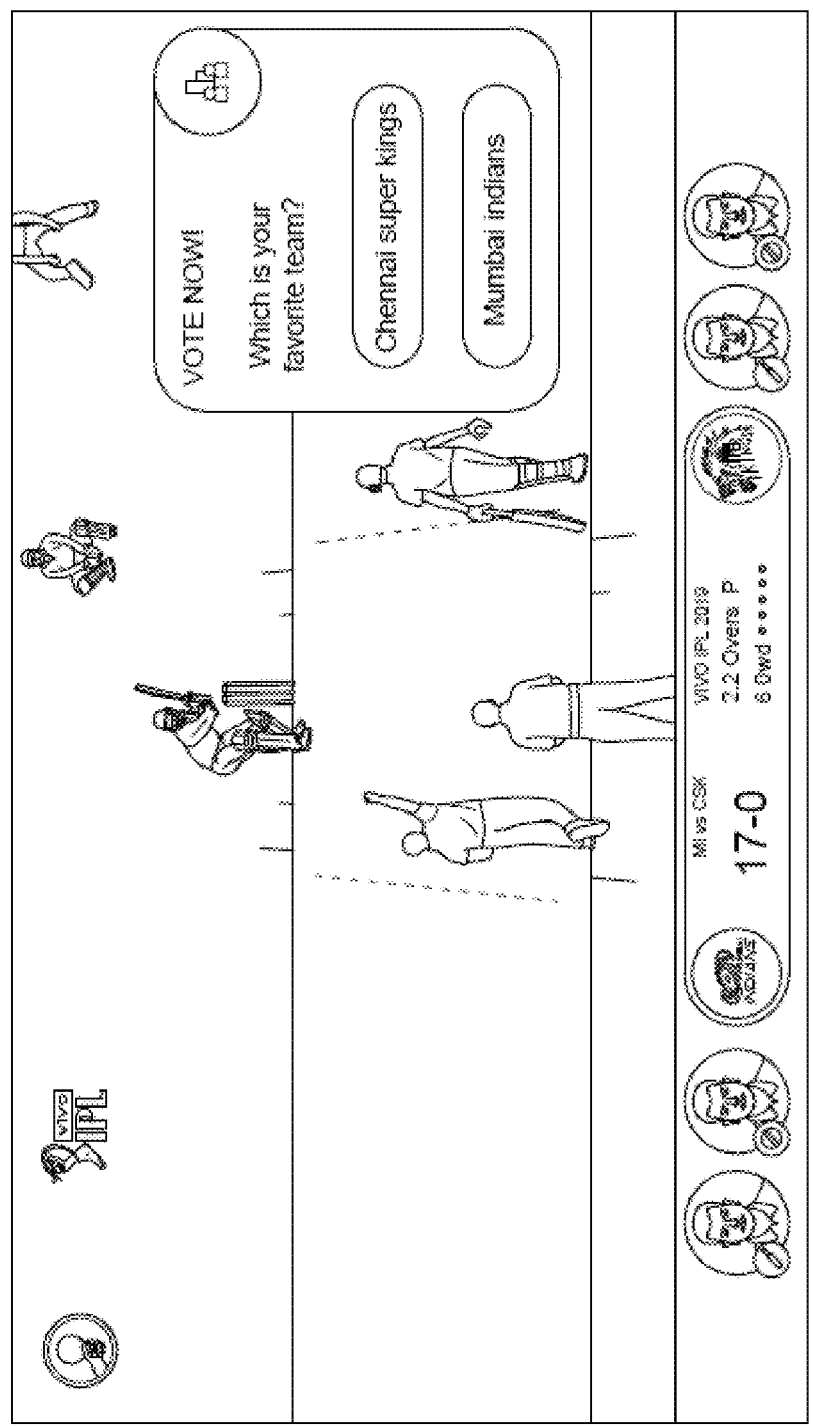
FIGS. 9A-9B exemplarily illustrates a screenshot of contextual interactive content overlaid on a hypertext transfer protocol live stream for engagement and game experience for users.
Figure 9B:
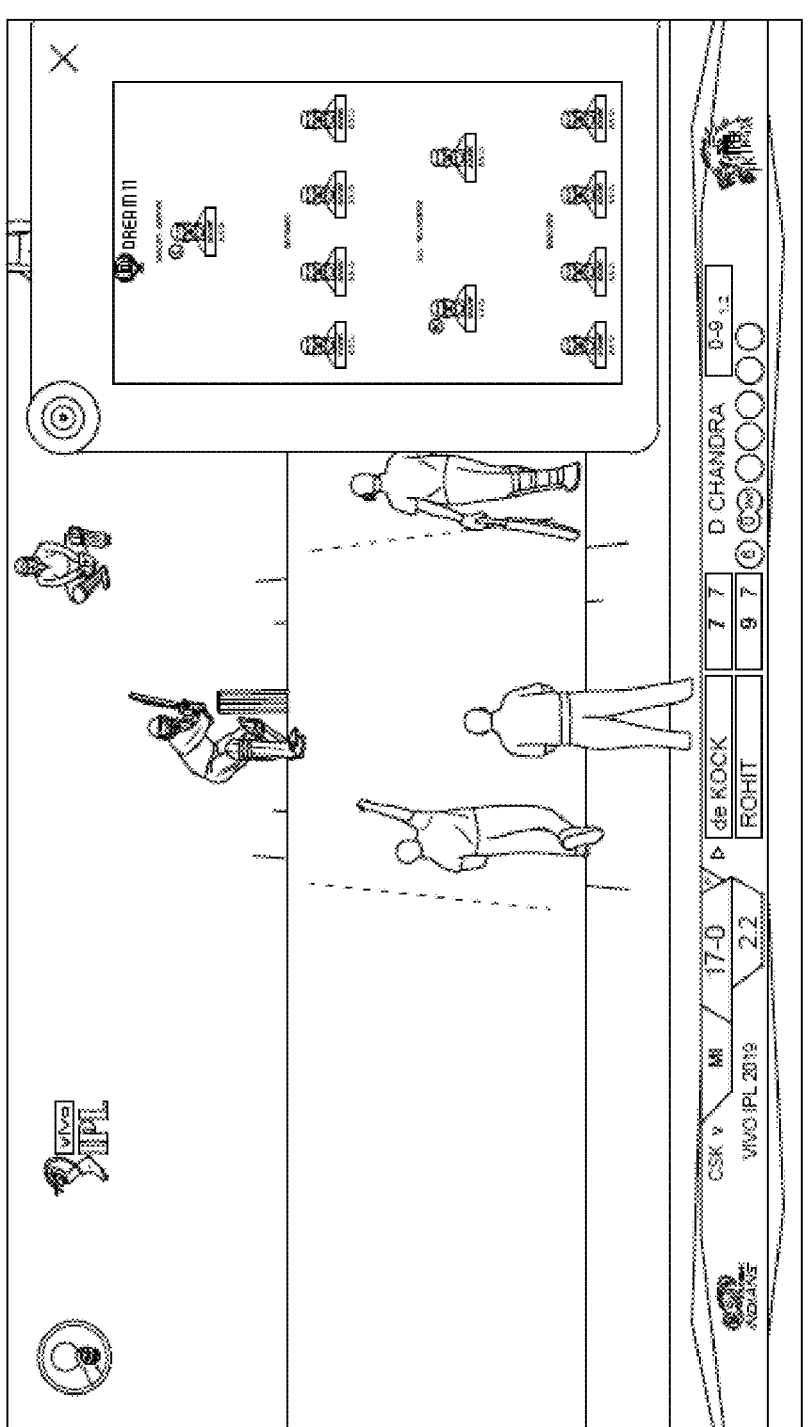

FIG. 8 exemplarily illustrates a screenshot of rich contextual interactive content overlaid on a hypertext transfer protocol live stream 101a. A head-to-head statistics of customized players are provided as rich content especially for the users to enhance their viewing interaction. The sports analytics system 100 shows the head-to-head comparison of key players in the match on their statistics and relevance to the game played on the match day. FIGS. 9A-9B exemplarily illustrate screenshots of the rich contextual interactive content overlaid on the hypertext transfer protocol live stream 101a for engagement and viewing experience for users. The rich contextual interactive content is customized to improve the engagement and provide an augmented viewing experience for the users. For example as shown in FIG. 9A, in a sporting event such as cricket, the rich contextual interactive content is delivered onto the hypertext transfer protocol live stream 101a in the form of a poll asking the users to select their favourite playing team. Again, this type of rich contextual interactive content improves the engagement of the users significantly for boosting the viewership. In some embodiment, this could be customized as a legal betting game enabling the users to bet on their favourite team or players for exchange of any reward. However, the sports analytics system 100 could be used for other sporting events to achieve desired results.

In one embodiment as exemplarily shown in FIG. 9B, the rich contextual interactive content in the form of a fantasy sports game is overlaid to keep the users actively engaged with the hypertext transfer protocol live stream 101a.

Figure 10A:
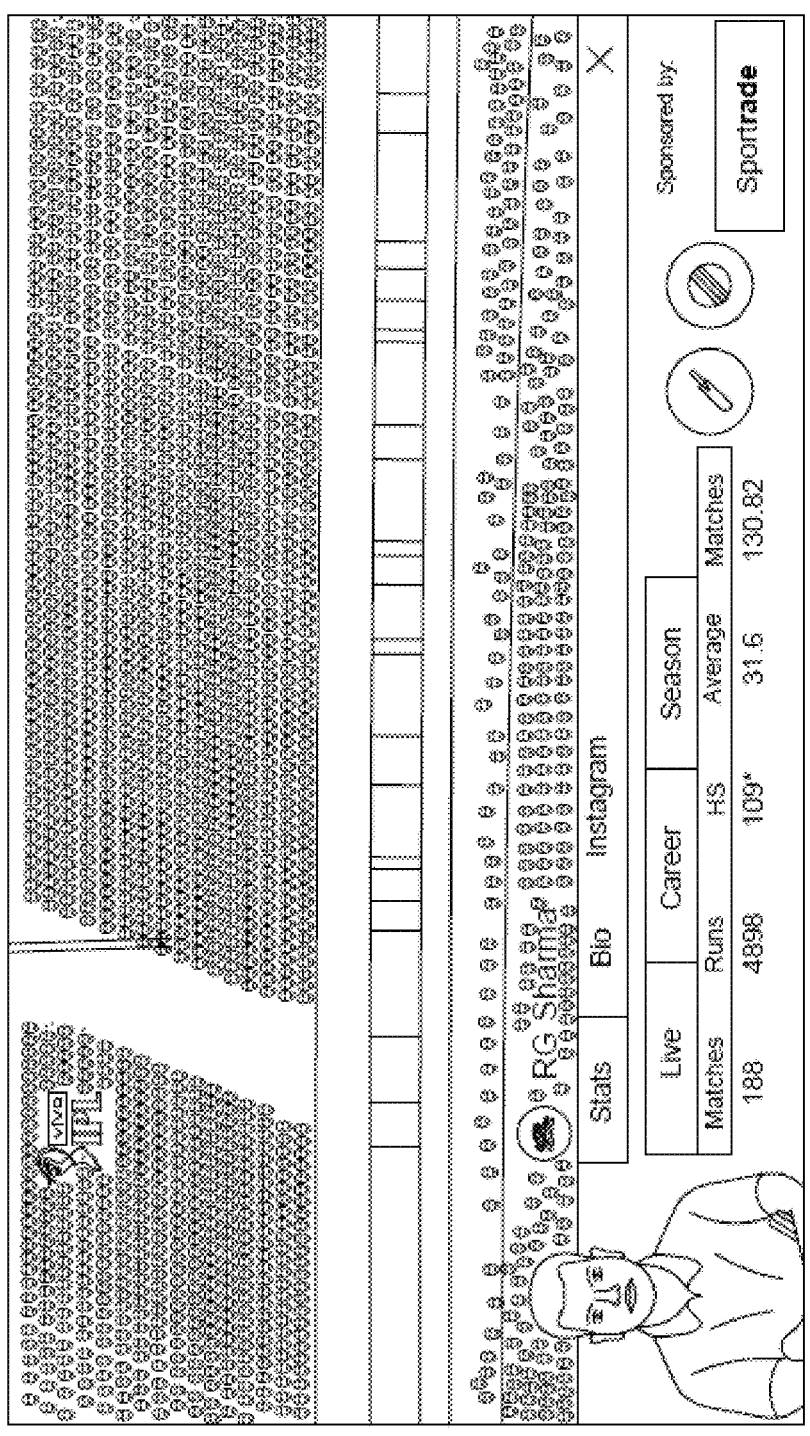
FIGS. 10A-10D exemplarily illustrates a screenshot of contextual interactive content overlaid on a hypertext transfer protocol live stream for augmenting monetization potential of existing content.
Figure 10B:
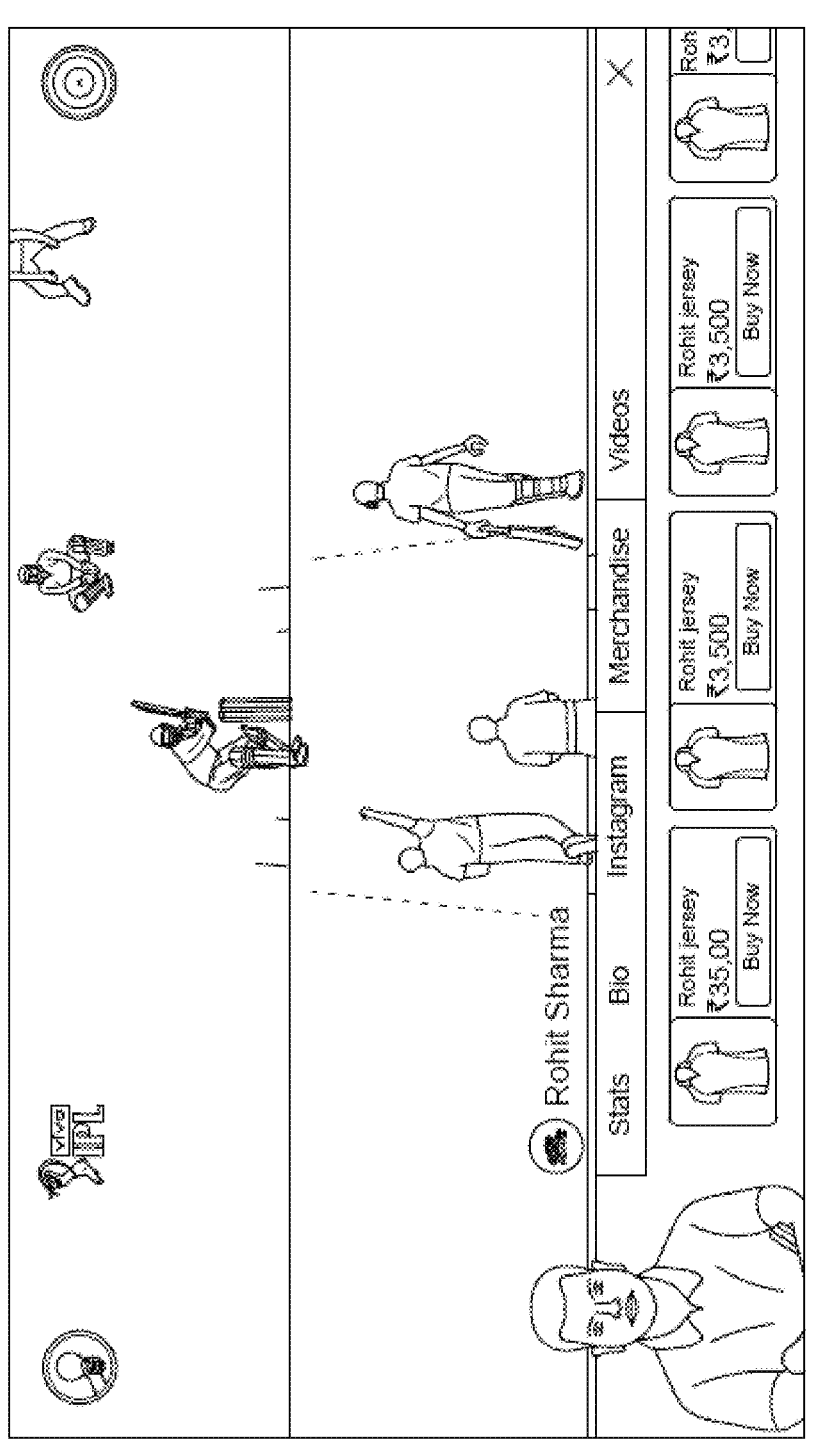
Figure 10C:
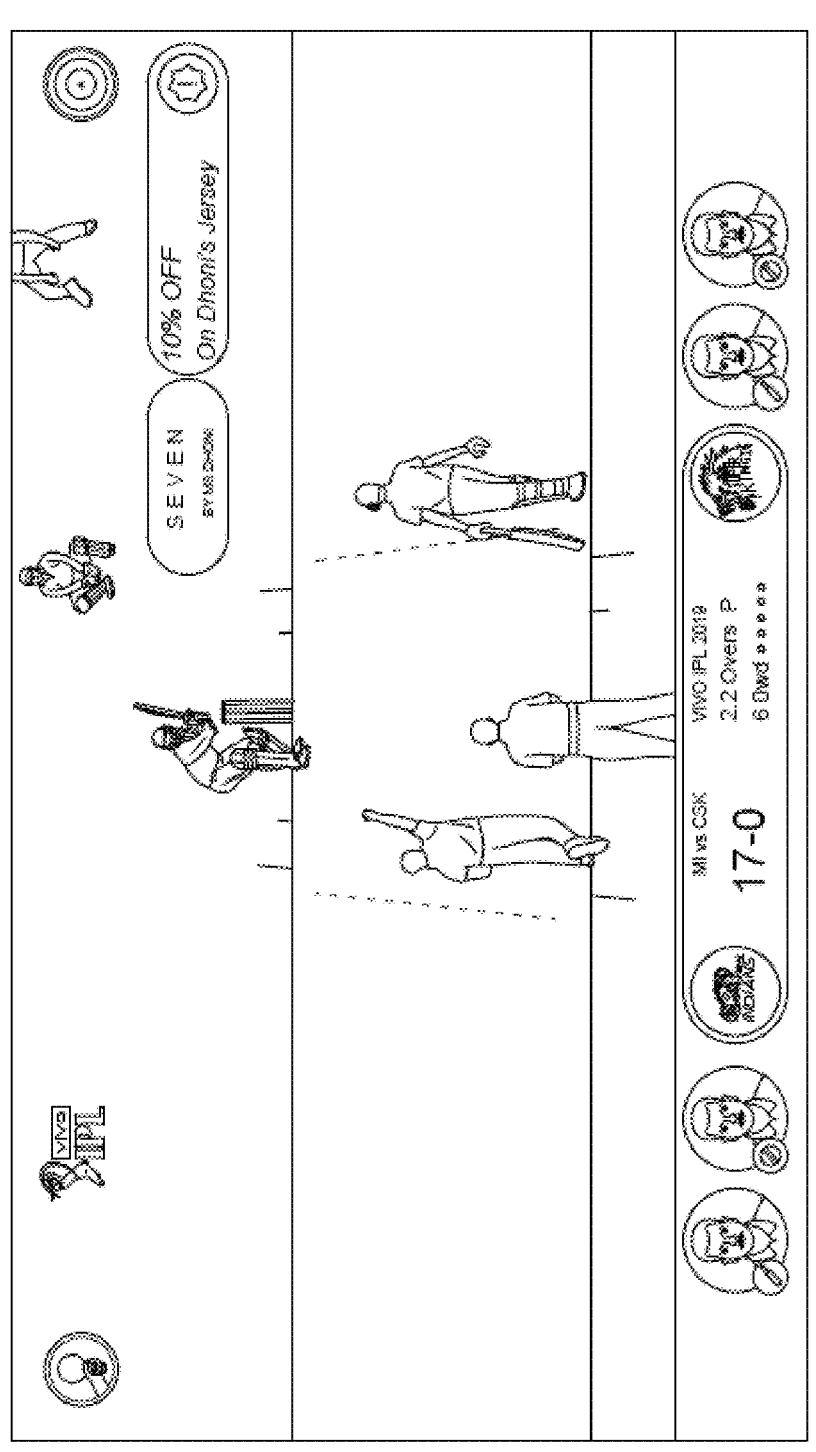
Figure 10D:
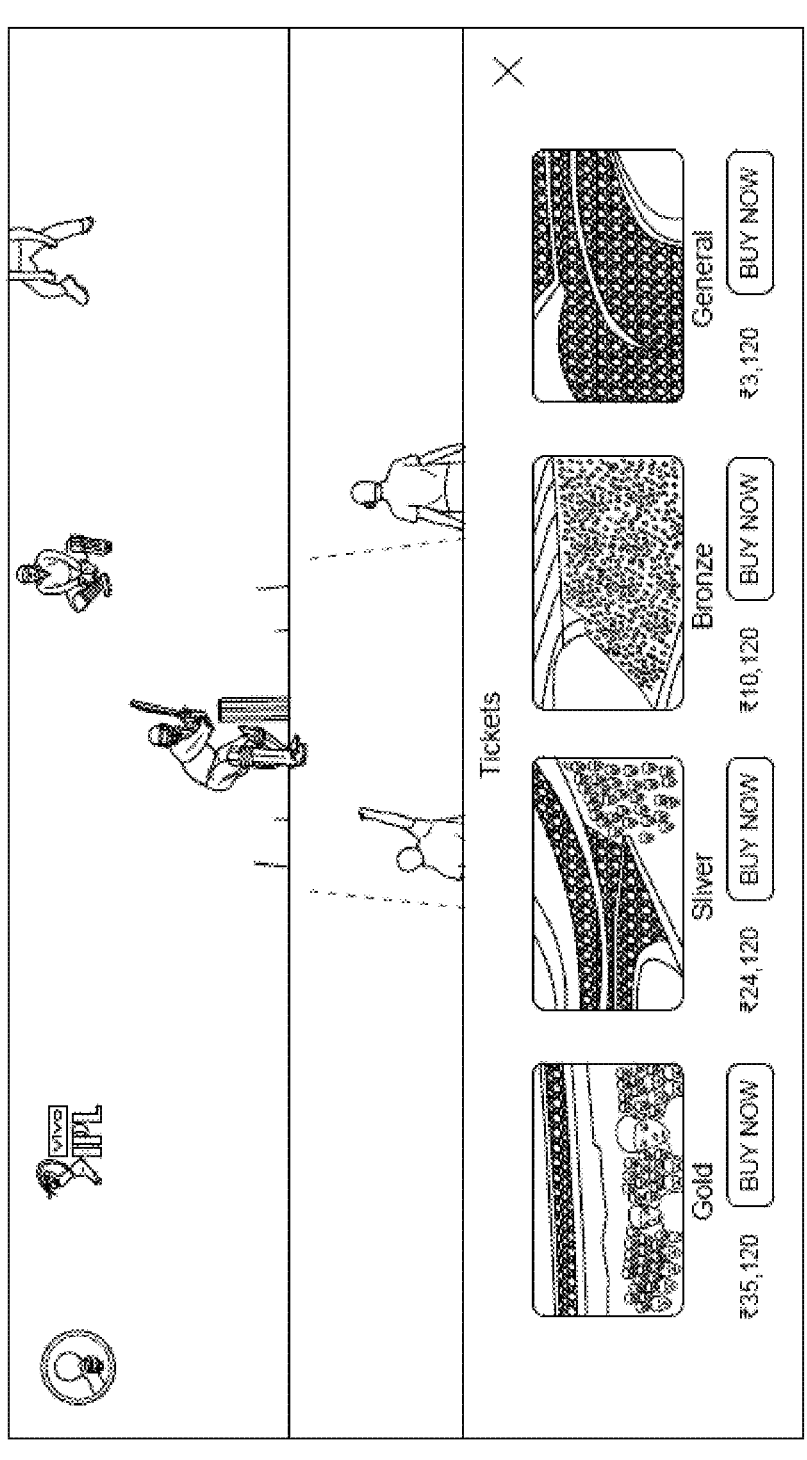

FIGS. 10A-10D exemplarily illustrate screenshots of the rich contextual interactive content overlaid on a hypertext transfer protocol live stream 101a for augmenting monetization potential of an existing content. The rich contextual interactive content is generated to augment the monetization potential of the existing content for the broadcasting companies and advertisers. The rich contextual interactive content could be at least one of a targeted advertisement, ticket sale and branded merchandise. In another exemplary embodiment as illustrated in FIG. 10C, the sports analytics system 100 augments the monetization potential by transmitting the rich contextual interactive content on the branded merchandise relevant to the identified players and teams to invite the users to buy online directly from their portal. Similarly, one or more targeted advertisements could be presented based on the recognition of the cues as shown in FIG. 10C. For example, when the sports analytics system 100 recognizes and tracks a player A from a Team A for a predetermined time interval, it can push targeted advertisement for any brand relevant to the player A. In another exemplary embodiment as shown in FIG. 10D, the monetization potential is also increased by transmitting a ticket selling platform onto the user device 111 to allow the users to book a ticket for themselves for any subsequent games of the season in the sporting event. For example, when Team A is playing against Team B in a knock out game of a cricket league, the sports analytics team recognizes the cues and detects the players and/or team to transmit the ticket selling platform to give an option for the users to buy tickets for the next game depending on the outcome of the ongoing game.

Figure 11:
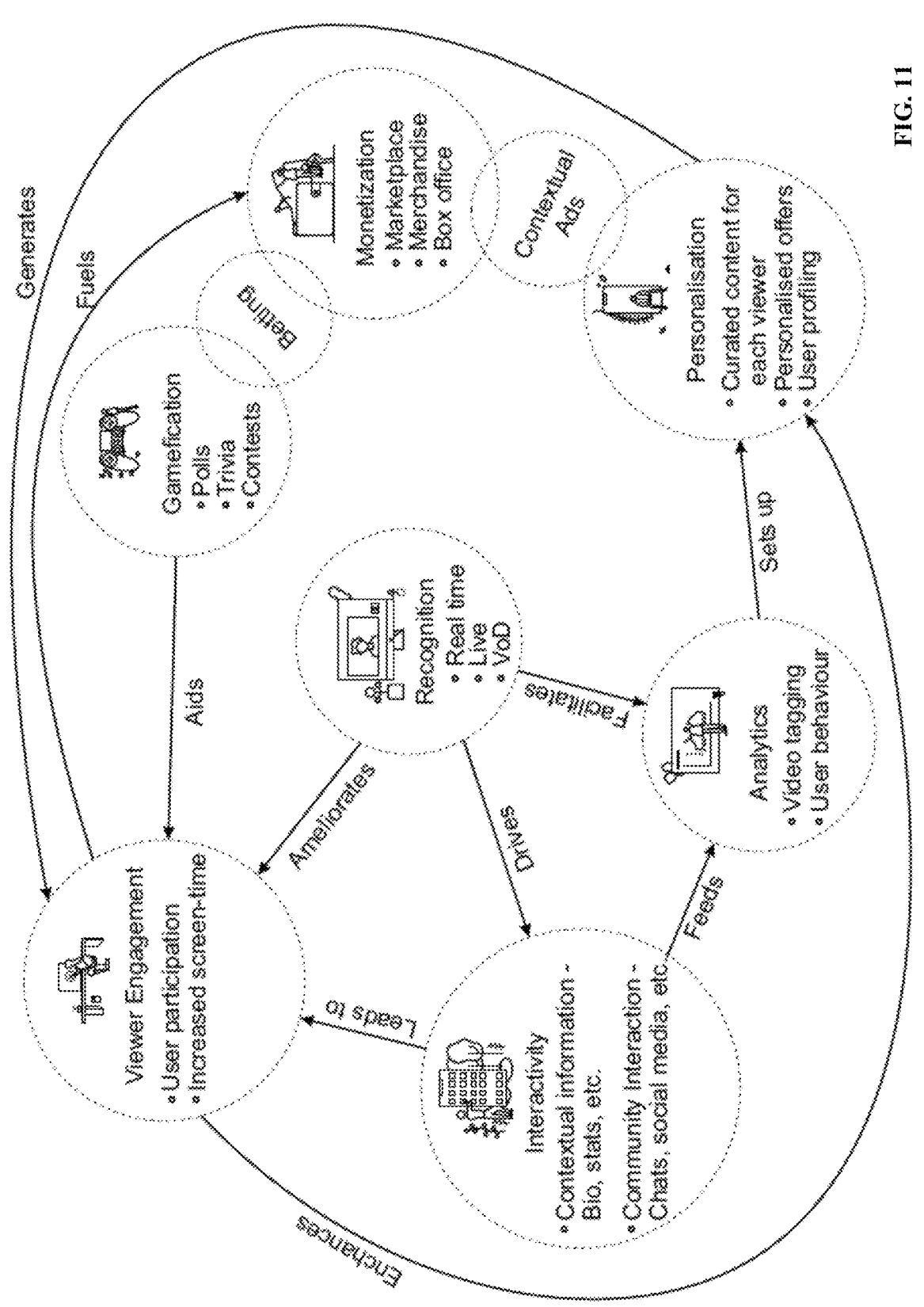
FIG. 11 exemplarily illustrates a screenshot of user engagement for enhancing and augmenting monetization potential of existing content at the consumer end.

The sports analytics system 100 enhances video streams by providing an interactive layer for user-engagement. The sports analytics system 100 introduces interactivity and allows for personalizing content for increasing the viewer engagement by performing multi-faceted video and user analytics. The sports analytics system 100 captures user information about the users accessing the content. Users demographics, favourite brands, social profile, digital spending information, favourite teams and/or players, time spent on the platform to access contextual interactive content, etc. are captured to deliver personalized content delivery thereby augmenting the monetization. Similarly, the sports analytics system 100 allows the content owners to deliver rich contextual advertisement by recognizing who is on screen and identifying what a user is actually clicking on the contextual interactive content in the hypertext transfer protocol live stream 101a. As shown in FIG. 11, real-time recognition is a vital part of this augmentation, as it aids in providing context to make the content more relevant. The sports analytics system 100 is made available on clients' websites through a plugin or can be integrated with clients' applications (Android/iOS) through an SDK. Further, the sports analytics system 100 pumps real-time frame level recognition data into a real-time database, along with other data components such as configuration data, player/team information, live game statistics, games for fans such as polls or fantasy, or an online marketplace. This data is downloaded periodically in the plugin/SDK using which the interactivity layer is presented to consumers. With this setup, users can access/interact with the aforementioned value additions. The sports analytics system 100 accepts video streams in various formats such as hypertext transfer protocol live stream inbuilt in the plugin/SDK. The plugin/SDK also handles the synchronization of the hypertext transfer protocol live stream at the frame level with the recognition data downloaded.

A non-transitory computer readable storage medium having embodied with computer program codes comprising instructions executable by at least one processor 201 in the sports analytics system 100 for analyzing a live video broadcast stream of a sporting event. The computer program codes comprise a first computer program code for receiving the live video broadcast stream of the sporting event from one or more video capturing devices; a second computer program code for splitting the live broadcast stream into a real time messaging protocol stream and a hypertext transfer protocol live stream; a third computer program code for analyzing the real time messaging protocol stream within a predetermined time interval, wherein the predetermined time interval comprises a phase difference between the real time messaging protocol stream and the hypertext transfer protocol live stream, and wherein the predetermined time interval is less than a frame persistence time of a frame; a fourth computer program code for detecting one or more persons present in a frame of the real time messaging protocol stream, using one or more cues selected from a first set of cues comprising a facial detection, a head detection, a person detection, and a jersey number detection based on availability of the first set of cues; a fifth computer program code for tracking the detected persons in the frame, by analyzing one or more preceding frames of the real time messaging protocol stream; a sixth computer program code for recognizing the tracked persons in the frame using one or more cues selected from a second set of cues comprising a facial recognition, a person recognition, a jersey recognition, a live score feed of the sporting event, and a commentary of the sporting event based on availability of the second set of cues, wherein the jersey recognition comprises one or more of jersey number classification and team recognition, wherein individual weights are assigned to each of the facial recognition, the person recognition, and the jersey recognition when the facial recognition, the person recognition, and the jersey recognition are performed in the frame, wherein if any of the facial recognition, the person recognition, and the jersey recognition is unavailable, one or more of the live score feed and the commentary is used for the identification of the one or more players in the frame, and wherein individual weights are determined based on clarity of each person recognized in the frame; a seventh computer program code for identifying one or more players in the frame by comparing the assigned weights for each of the recognized persons with pre-existing data of all players; and an eighth computer program code for transmitting the hypertext transfer protocol live stream and analysis data comprising contextual interactive content of the identified players to a client application provided on a user device by the sports analytics system within the predetermined time interval.

The computer program codes further comprises a ninth computer program code for providing user interaction with the interactive video. The contextual interactive content of the identified players is displayed on the user device without the contextual interactive content of the identified players overlapping existing graphics of the hypertext transfer protocol live stream. The contextual interactive content of the identified players comprises a dynamic display of one or more of a scorecard, a player information, and match statistics, wherein the contextual interactive content of the identified players can be customized and shared on social media. Similarly, the system allows the users to share their favourite moments of the game online in real-time in one or more social media platforms.

The computer program codes are executed to display the contextual interactive content without overlapping existing graphics displayed on the live video broadcast stream of the sporting event. The contextual interactive content also includes any interesting information about the player statistics and bio. The contextual interactive content could be customized according to the requirements and optionally shared on any social media platforms. In some embodiments, the contextual interactive content could be customized to particular season of the game and the corresponding player statistics in that season. In another embodiment, one or more social media posts of the players and teams are provided as on-demand enhanced content on the live video broadcast stream to more insights of the player and team activities outside the sport. In another embodiment, head-to-head statistics of customized players are provided as rich content especially for the users to enhance their viewing interaction. In another embodiment, the contextual interactive content is customized to improve the engagement and provide enhanced game experience for the users.

The computer program codes are stored in a computer usable or computer readable memory capable of directing a computer or other programmable data processing apparatus to implement the functionality in a particular manner. The computer program codes may also be executed by an article of manufacture containing instruction means for performing the functions described in each block or flowchart of the flowchart. The computer program instructions may be loaded onto the computer or other programmable data processing equipment so that a series of operating steps may be performed on a computer or other programmable data processing equipment to execute the instructions for the sports analytics system 100.

The sports analytics system 100 for analyzing the live video broadcast stream of the sporting event provides significant benefits for end users, content owners, advertisers, broadcasting companies, sports companies, sports franchise, teams, etc., in a multi-faceted manner. The users can simply interact with the contextual content displayed around the players and share their favourite moments of the game online in one or more social media platforms. This platform also allows the users to buy tickets for the interested games and purchase the merchandise sold by the relevant teams or franchise. The sports analytics system 100 allows the content owners to capture users demographics, brands followed by the users, social profile, digital spending information, favourite teams and/or players, time spent on the AI powered contextual interactive content delivery platform, etc. Further, this information could also be used deliver personalized content delivery and monetization. The sports analytics system 100 helps to generate incremental revenue through pay per fan interaction mode and does not require any additional hardware such as cameras and sensors for implementation. The existing hardware is sufficient to implement the system in a cost-effective and hassle-free manner. The sports analytics system 100 enables the content owners to choose from a wide range of interactivity options and offer them to the users and allows them to deliver contextual advertisement based on who is on screen and based on what a viewer is actually clicking on. The users get significant benefits by following their favourite player, statistics and their social media updates at one place and get more rich information to enjoy the game and be more interactive with the live video broadcast stream.

The foregoing examples have been provided merely for explanation and are in no way to be construed as limiting of the method and the sports analytics system 100 disclosed herein. While the method and the sports analytics system 100 have been described with reference to various embodiments, it is understood that the words, which have been used herein, are words of description and illustration, rather than words of limitation. Furthermore, although the method and the sports analytics system 100 have been described herein with reference to particular means, materials, and embodiments, the method and the sports analytics system 100 are not intended to be limited to the particulars disclosed herein; rather, the method and the sports analytics system 100 extend to all functionally equivalent structures, methods and uses, such as are within the scope of the appended claims. While embodiments described herein are directed to analyzing a live video broadcast stream of a sporting event, the embodiments can also be directed to analyzing a pre-recorded video stream of a sporting event as recited in the claims. While multiple embodiments are disclosed, it will be understood by those skilled in the art, having the benefit of the teachings of this specification, that the method and the sports analytics system 100 disclosed herein are capable of modifications and other embodiments may be effected and changes may be made thereto, without departing from the scope and spirit of the method and the sports analytics system 100 disclosed herein.

What is claimed is:

1. A sports analytics system incorporating a computer server for analyzing a live video broadcast stream of a sporting event, said sport analytics system comprising:

a video demuxer for receiving said live video broadcast stream of said sporting event from a video capture device and splitting said received live broadcast stream into a real time messaging protocol stream and a hypertext transfer protocol live stream;

a non-transitory computer readable storage media for storing computer program instructions defined by modules of said sport analytics system; and at least one processor communicatively coupled to said non-transitory computer readable storage media, said at least one processor configured to execute said computer program instructions defined by said modules of said sport analytics system, said modules comprising:

an analytics module for analyzing said real time messaging protocol stream within a predetermined time interval, wherein said predetermined time interval corresponds to a phase difference between said real time messaging protocol stream and said hypertext transfer protocol live stream, wherein said analytics module comprises:

a detection module for detecting one or more persons present in a frame of said real time messaging protocol stream, using one or more cues selected from a first set of cues comprising a facial detection, a head detection, a person detection, and a jersey number detection based on availability of said first set of cues;

a tracking module for tracking said detected persons in said frame, by analyzing one or more preceding frames of said real time messaging protocol stream;

a recognition module for recognizing said tracked persons in said frame using one or more cues selected from a second set of cues comprising a facial recognition, a person recognition, a jersey recognition, a live score feed of said sporting event, and a commentary of said sporting event based on availability of said second set of cues, wherein individual weights are assigned to each of said facial recognition, said person recognition, and said jersey recognition when said facial recognition, said person recognition, and said jersey recognition are performed in said frame;

a comparison module for identifying one or more players in said frame by comparing said assigned weights for each of said recognized persons with pre-existing data of all players; and a transmission module for transmitting said hypertext transfer protocol live stream and analysis data comprising contextual interactive content of said identified players to a client application provided on a user device by said sports analytics system within said predetermined time interval, wherein said live video broadcast stream is transformed into an interactive video comprising said contextual interactive content of said identified players.

2. The sports analytics system of claim 1, wherein if any of said facial recognition, said person recognition, and said jersey recognition is unavailable, said recognition module uses one or more of said live score feed and said commentary for said identification of said one or more players in said frame.

3. The sports analytics system of claim 1, wherein said predetermined time interval is less than a frame persistence time of said frame.

4. The sports analytics system of claim 1, wherein said jersey recognition comprises one or more of jersey number classification and team recognition.

5. The sports analytics system of claim 1, wherein said individual weights are determined based on clarity of each person recognized in said frame.

6. The sports analytics system of claim 1, wherein said client application comprises an interaction module for providing user interaction with said interactive video.

7. The sports analytics system of claim 1, wherein said contextual interactive content of said identified players is displayed on said user device without said contextual interactive content of said identified players overlapping existing graphics of said hypertext transfer protocol live stream.

8. The sports analytics system of claim 7, wherein said contextual interactive content of said identified players comprises a dynamic display of one or more of a scorecard, player information, and match statistics, wherein said contextual interactive content of said identified players is configured to be customized and shared on social media.

9. A method for analyzing a live video broadcast stream of a sporting event, the method employing a sports analytics system comprising at least one processor configured to execute computer program instructions for performing said method, said method comprising:

receiving said live video broadcast stream of said sporting event from a video capturing device, by a video demuxer of said sports analytics system;

splitting said live broadcast stream into a real time messaging protocol stream and a hypertext transfer protocol live stream, by said video demuxer of said sports analytics system;

analyzing said real time messaging protocol stream within a predetermined time interval, wherein said predetermined time interval comprises a phase difference between said real time messaging protocol stream and said hypertext transfer protocol live stream, wherein said analysis comprises:

detecting one or more persons present in a frame of said real time messaging protocol stream, using one or more cues selected from a first set of cues comprising a facial detection, a head detection, a person detection, and a jersey number detection based on availability of said first set of cues;

tracking said detected persons in said frame, by analyzing one or more preceding frames of said real time messaging protocol stream;

recognizing said tracked persons in said frame using one or more cues selected from a second set of cues comprising a facial recognition, a person recognition, a jersey recognition, a live score feed of said sporting event, and a commentary of said sporting event based on availability of said second set of cues, wherein individual weights are assigned to each of said facial recognition, said person recognition, and said jersey recognition when said facial recognition, said person recognition, and said jersey recognition are performed in said frame; and identifying one or more players in said frame by comparing said assigned weights for each of said recognized persons with pre-existing data of all players; and transmitting said hypertext transfer protocol live stream and analysis data comprising contextual interactive content of said identified players to a client application provided on a user device by said sports analytics system within said predetermined time interval;

whereby said live video broadcast stream is transformed into an interactive video comprising said contextual interactive content of said identified players and transmitted to said user device.

10. The method of claim 9, wherein if any of said facial recognition, said person recognition, and said jersey recognition is unavailable, one or more of said live score feed and said commentary is used for said identification of said one or more players in said frame.

11. The method of claim 9, wherein said predetermined time interval is less than a frame persistence time of said frame.

12. The method of claim 9, wherein said jersey recognition comprises one or more of jersey number classification and team recognition.

13. The method of claim 9, wherein said individual weights are determined based on clarity of each person recognized in said frame.

14. The method of claim 9, wherein a user can interact with one or more of said identified players in said interactive video.

15. The method of claim 9, wherein said contextual interactive content of said identified players is displayed on said user device without said contextual interactive content of said identified players overlapping graphics of said hypertext transfer protocol live stream.

16. The method of claim 15, wherein said contextual interactive content of said identified players comprises a dynamic display of one or more of a scorecard, player information, and match statistics, wherein said contextual interactive content of said identified players is configured to be customized and shared on social media.

17. A non-transitory computer readable storage medium having embodied thereon, computer program codes comprising instructions executable by at least one processor for analyzing a live video broadcast stream of a sporting event, said computer program codes comprising:

a first computer program code for receiving said live video broadcast stream of said sporting event from one or more video capturing devices;

a second computer program code for splitting said live broadcast stream into a real time messaging protocol stream and a hypertext transfer protocol live stream;

a third computer program code for analyzing said real time messaging protocol stream within a predetermined time interval, wherein said predetermined time interval comprises a phase difference between said real time messaging protocol stream and said hypertext transfer protocol live stream;

a fourth computer program code for detecting one or more persons present in a frame of said real time messaging protocol stream, using one or more cues selected from a first set of cues comprising a facial detection, a head detection, a person detection, and a jersey number detection based on availability of said first set of cues;

a fifth computer program code for tracking said detected persons in said frame, by analyzing one or more preceding frames of said real time messaging protocol stream;

a sixth computer program code for recognizing said tracked persons in said frame using one or more cues selected from a second set of cues comprising a facial recognition, a person recognition, a jersey recognition, a live score feed of said sporting event, and a commentary of said sporting event based on availability of said second set of cues, wherein individual weights are assigned to each of said facial recognition, said person recognition, and said jersey recognition when said facial recognition, said person recognition, and said jersey recognition performed in said frame;

a seventh computer program code for identifying one or more players in said frame by comparing said assigned weights for each of said recognized persons with pre-existing data of all players; and an eighth computer program code for transmitting said hypertext transfer protocol live stream and analysis data comprising contextual interactive content of said identified players to a client application provided on a user device by said sports analytics system within said predetermined time interval.

18. The non-transitory computer readable storage medium of claim 17, wherein if any of said facial recognition, said person recognition, and said jersey recognition is unavailable, one or more of said live score feed and said commentary is used for said identification of said one or more players in said frame.

19. The non-transitory computer readable storage medium of claim 17, wherein said computer program codes further comprise a ninth computer program code for providing user interaction with said interactive video.

20. The non-transitory computer readable storage medium of claim 17, wherein said predetermined time interval is less than a frame persistence time of said frame.

21. The non-transitory computer readable storage medium of claim 17, wherein said jersey recognition comprises one or more of jersey number classification and team recognition.

22. The non-transitory computer readable storage medium of claim 17, wherein said individual weights are determined based on clarity of each person recognized in said frame.

23. The non-transitory computer readable storage medium of claim 17, wherein said contextual interactive content of said identified players is displayed on said user device without said contextual interactive content of said identified players overlapping existing graphics of said hypertext transfer protocol live stream.

24. The non-transitory computer readable storage medium of claim 23, wherein said contextual interactive content of said identified players comprises a dynamic display of one or more of a scorecard, player information, and match statistics, wherein said contextual interactive content of said identified players is configured to be customized and shared on social media.

25. A sports analytics system incorporating a computer server for analyzing a pre-recorded video stream of a sporting event, said sport analytics system comprising:

a non-transitory computer readable storage media for storing computer program instructions defined by modules of said sport analytics system; and at least one processor communicatively coupled to said non-transitory computer readable storage media, said at least one processor configured to execute said computer program instructions defined by said modules of said sport analytics system, said modules comprising:

an analytics module for analyzing said pre-recorded video stream, wherein said analytics module comprises:

a detection module for detecting one or more persons present in a frame of said pre-recorded video stream, using one or more cues selected from a first set of cues comprising a facial detection, a head detection, a person detection, and a jersey number detection based on availability of said first set of cues;

a tracking module for tracking said detected persons in said frame, by analyzing one or more preceding frames;

a recognition module for recognizing said tracked persons in said frame using one or more cues selected from a second set of cues comprising a facial recognition, a person recognition, a jersey recognition, a score feed of said sporting event, and a commentary of said sporting event based on availability of said second set of cues, wherein individual weights are assigned to each of said facial recognition, said person recognition, and said jersey recognition when said facial recognition, said person recognition, and said jersey recognition are performed in said frame;

a comparison module for identifying one or more players in said frame by comparing said assigned weights for each of said recognized persons with pre-existing data of all players; and a transmission module for transmitting said pre-recorded video stream and analysis data comprising contextual interactive content of said identified players to a client application provided on a user device by said sports analytics system, wherein said pre-recorded video stream is transformed into an interactive video comprising said contextual interactive content of said identified players.

26. A method for analyzing a pre-recorded video stream of a sporting event, the method employing a sports analytics system comprising at least one processor configured to execute computer program instructions for performing said method, said method comprising:

analyzing said pre-recorded video stream, wherein said analysis comprises:

detecting one or more persons present in a frame of said pre-recorded video stream, using one or more cues selected from a first set of cues comprising a facial detection, a head detection, a person detection, and a jersey number detection based on availability of said first set of cues;

tracking said detected persons in said frame, by analyzing one or more preceding frames;

recognizing said tracked persons in said frame using one or more cues selected from a second set of cues comprising a facial recognition, a person recognition, a jersey recognition, a score feed of said sporting event, and a commentary of said sporting event based on availability of said second set of cues, wherein individual weights are assigned to each of said facial recognition, said person recognition, and said jersey recognition when said facial recognition, said person recognition, and said jersey recognition are performed in said frame; and identifying one or more players in said frame by comparing said assigned weights for each of said recognized persons with pre-existing data of all players; and transmitting said pre-recorded video stream and analysis data comprising contextual interactive content of said identified players to a client application provided on a user device by said sports analytics system;

whereby said pre-recorded video stream is transformed into an interactive video comprising said contextual interactive content of said identified players and transmitted to said user device.

* * * * *